US012756524B2

(12) United States Patent
Fang et al.

(10) Patent No.: US 12,756,524 B2
(45) Date of Patent: Oct. 6, 2026

(54) DYNAMIC LINK SELECTION FOR RELIABLE RETRANSMISSION IN WIRELESS COMMUNICATIONS

(71) Applicant: MediaTek Inc., Hsinchu City (TW)

(72) Inventors: Yonggang Fang, San Jose, CA (US); James Chih-Shi Yee, San Jose, CA (US); Chien-Fang Hsu, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 0 days.

(21) Appl. No.: 18/211,758

(22) Filed: Jun. 20, 2023

(65) Prior Publication Data

US 2024/0014982 A1 Jan. 11, 2024

Related U.S. Application Data

(60) Provisional application No. 63/368,088, filed on Jul. 11, 2022.

(51) Int. Cl.
*H04W 84/12* (2009.01)
*H04L 5/00* (2006.01)
*H04W 72/541* (2023.01)

(52) U.S. Cl.
CPC ......... *H04L 5/0055* (2013.01); *H04W 72/541* (2023.01); *H04W 84/12* (2013.01)

(58) Field of Classification Search
CPC .... H04W 84/12; H04W 72/541; H04L 5/0055
See application file for complete search history.

(56) References Cited

U.S. PATENT DOCUMENTS

| | | | | |
|---|---|---|---|---|
| 2013/0107916 | A1 | 5/2013 | Liu et al. | |
| 2016/0380727 | A1 | 12/2016 | Ryu et al. | |
| 2021/0127420 | A1* | 4/2021 | Lu | H04W 74/0808 |
| 2021/0227502 | A1 | 7/2021 | Huang et al. | |
| 2022/0385403 | A1* | 12/2022 | Song | H04W 76/15 |
| 2023/0011167 | A1* | 1/2023 | Chitrakar | H04W 74/0816 |
| 2023/0308938 | A1* | 9/2023 | Sun | H04W 28/0278 |

FOREIGN PATENT DOCUMENTS

| | | | |
|---|---|---|---|
| TW | 202209924 | A | 3/2022 |
| WO | WO 2021125491 | A1 | 6/2021 |
| WO | WO 2021126075 | A1 | 6/2021 |

OTHER PUBLICATIONS

European Patent Office, Extended European Search Report in European Patent Application No. 23183316.1, Nov. 20, 2023.

(Continued)

*Primary Examiner* — Kent Krueger

(74) *Attorney, Agent, or Firm* — Andy M. Han; Han IP PLLC

(57) ABSTRACT

Techniques pertaining to dynamic link selection for reliable retransmission in wireless communications are described. A multi-link device (MLD) establishes a block acknowledgement (Block Ack) agreement or a protected Block Ack agreement with one other MLD on one or more enabled links for dynamic link selection. The MLD communicates with the other MLD on at least one of the one or more enabled links prior to termination of the Block Ack agreement or the protected Block Ack agreement.

16 Claims, 14 Drawing Sheets

(56) References Cited

OTHER PUBLICATIONS

Abhishek Patil (Qualcomm): "LB266: CR for BA operation with MLO", IEEE Draft; 11-22-1005-00-00BE-LB266-CR-for-BA-Operation-With-MLO, IEEE-SA Mentor, Piscataway, NJ USA, vol. 802.11 EHT; 802.11be, Jul. 9, 2022 (Jul. 9, 2022), pp. 1-5.

"35. Extremely high throughput (EHT) MAC specification 35.1 Introduction", IEEE Draft; ; TGBE_CL_35, IEEE-SA, Piscataway, NJ USA, vol. 80.11be drafts, No. D2.0, May 23, 2022 (May 23, 2022), pp. 1-142.

Rojan Chitrakar (Panasonic): "Multi-link block ack architecture", IEEE Draft; 11-20-0055-01-00BE-Multi-Link-Block-Ack-Architecture, IEEE-SA Mentor, Piscataway, NJ USA, vol. 802.11 EHT; 802.11be, No. 1, Apr. 17, 2020 (Apr. 17, 2020), pp. 1-10.

Taiwan Intellectual Property Office, Office Action for Taiwan Patent Application No. 112125849, May 12, 2026.

* cited by examiner

300

600

700

DYNAMIC LINK SELECTION FOR RELIABLE RETRANSMISSION IN WIRELESS COMMUNICATIONS

CROSS REFERENCE TO RELATED PATENT APPLICATION(S)

The present disclosure is part of a non-provisional patent application claiming the priority benefit of U.S. Provisional Patent Application No. 63/368,088, filed 11 Jul. 2022, the content of which herein being incorporated by reference in its entirety.

TECHNICAL FIELD

The present disclosure is generally related to wireless communications and, more particularly, to dynamic link selection for reliable retransmission in wireless communications.

BACKGROUND

Unless otherwise indicated herein, approaches described in this section are not prior art to the claims listed below and are not admitted as prior art by inclusion in this section.

In wireless communications, such as Wi-Fi (or WiFi) and wireless local area network (WLAN) based on one or more Institute of Electrical and Electronics Engineers (IEEE) 802.11 standards, a wireless link may not be reliable due to a weak received signal strength indicator (RSSI) and/or a week signal-to-interference-and-noise ratio (SINR) or interference from other transmitters in coverage area, especially when operating on an unlicensed spectrum. This may occur on downlink (DL) or uplink (UL) or both directions, due to different radio conditions on the originator side or the recipient side (e.g., unbalanced DL and UL on transmission and reception). Improving transmission reliability is becoming a potential scope of next-generation Wi-Fi project in the IEEE 802.11 standard. The ultra-high reliability for latency-sensitive transmissions is desirable for many applications such as industry internet of things (IIoT), artificial intelligence (AI), gaming and so on, especially in non-line-of-sight (NLOS) conditions of indoor/outdoor environments.

The existing Wi-Fi technology relies on retransmissions to improve transmission success ratio (i.e., reliability) on a link. However, multiple retransmissions on a given link or lowering a modulation and coding scheme (MCS) rate of retransmission may not succeed if interference persists on the link and increases the delay of user data payload reception. This could create an issue for latency-sensitive applications which tend to have a strict delay bound requirement. In order to support low-latency applications in WLAN interworking with time-sensitive networking (TSN), the deterministic scheduling and synchronization of TSN entities are required. Therefore, a transmitting station (STA) needs to make deterministic scheduling for low-latency traffic and complete the transmission and retransmission within the scheduled time interval at expected reliability. This also requires improvement of retransmission reliability. Therefore, there is a need for a solution of dynamic link selection for reliable retransmission in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to dynamic link selection for reliable retransmission in wireless communications. Various schemes proposed herein may be related to improving transmission reliability for latency-sensitive transmission via selection of a more reliable link for block acknowledgement (herein interchangeably referred to as "BlockAck", "Block Ack" and "BA") transmission and/or user data retransmission. The proposed schemes may be used for multi-link or multi-access point (multi-AP) operation of next-generation Wi-Fi. It is believed that, under various proposed schemes in accordance with the present disclosure, aforementioned issue(s) may be addressed or otherwise alleviated.

In one aspect, a method may involve a multi-link device (MLD) establishing a Block Ack agreement or a protected Block Ack agreement with one other MLD on one or more enabled links for dynamic link selection. The method may also involve the MLD communicating with the other MLD on at least one of the one or more enabled links prior to termination of the Block Ack agreement or the protected Block Ack agreement.

In another aspect, an apparatus implementable in an MLD may include a transceiver and a processor coupled to the transceiver. The transceiver may be configured to communicate wirelessly. The processor may be configured to establish a Block Ack agreement or a protected Block Ack agreement with one other MLD on one or more enabled links for dynamic link selection. The processor may be also configured to communicate with the other MLD on at least one of the one or more enabled links prior to termination of the Block Ack agreement or the protected Block Ack agreement.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, WiMax, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Figure 1:
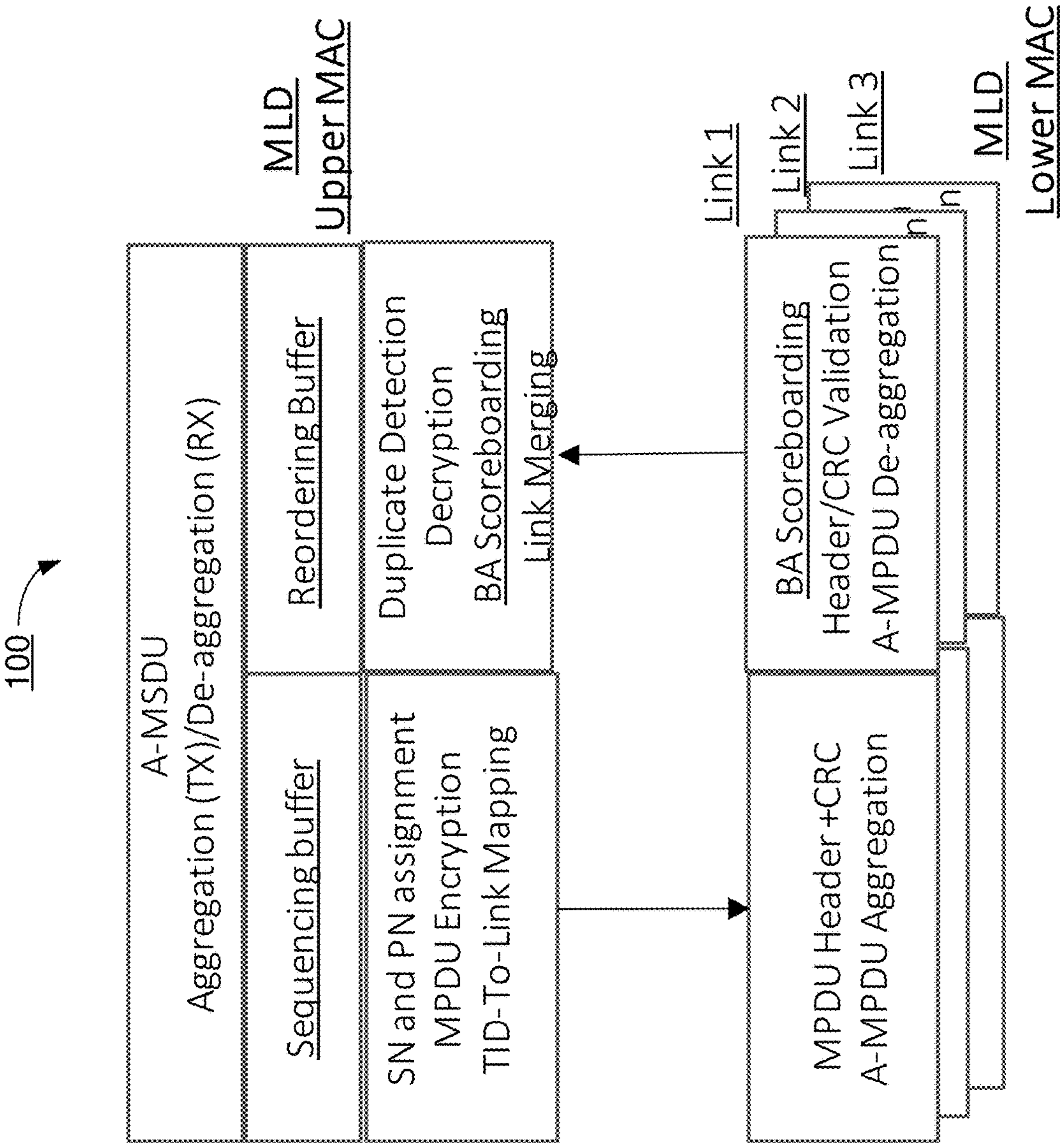
FIG. 1 is a diagram of an example architecture with which various proposed schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to dynamic link selection for reliable retransmission in wireless communications. According to the present disclosure, a number of possible solutions may be implemented separately or jointly. That is, although these possible solutions may be described below separately, two or more of these possible solutions may be implemented in one combination or another.

FIG. 1-FIG. 14 illustrate examples of implementation of various proposed schemes in network environment 100 in accordance with the present disclosure. The following description of various proposed schemes is provided with reference to FIG. 1~FIG. 14.

An access point (AP) multi-link device (MLD) and a STA MLD in a multi-link operation (MLO) may be configured for simultaneous transmission and reception (STR) on multiple links (although simultaneous receiving is not necessary). A Block Ack policy may be set to Block Ack in quality of service (QoS) control with default traffic identifier (TID) to link (T2L) mapping (or with a TID mapped to two or more links). Notably, an AP affiliated with an AP MLD corresponding to a link may or may not be collocated with that AP MLD. Presently, there are certain issues related to multi-link retransmission. One issue relates to one or more links being not reliable and thus leading to missing Block Acks. That is, STAs affiliated with an originator MLD may transmit an aggregate medium access control (MAC) protocol data unit (A-MPDU) to a STA affiliated with a recipient MLD over enabled links. Additionally, STAs affiliated with the recipient MLD may update the status of received MPDUs in scoreboards on link level. Moreover, STAs affiliated with the originator MLD may transmit Block Ack request (BAR) to STAs affiliated with the recipient MLD over the communication links to request the receiving status of transmitted MAC protocol data units (MPDUs) or A-MPDUs. Also, STAs affiliated with the recipient MLD may send BAs with status of received MPDU(s). However, if one or more enabled links are not reliably, such as having lower received signal strength indicator (RSSI) or strong interference at the originator side, the BA may not be received by the originator MLD successfully. This may result in retransmissions of MPDU(s) on the corresponding link(s) which increases delay and reduce efficiency if lower RSSI or strong interference persists on the corresponding links.

Another issue relates to one or more links being not reliable and thus leading to missing MPDUs or A-MPDUs. That is, one or more STAs affiliated with an originator MLD transmit MPDUs or A-MPDUs over the corresponding enabled link(s). Then, STAs affiliated with a recipient MLD update status of received MPDUs in scoreboards at link level. Additionally, STAs affiliated with the originator MLD may transmit BAR to the recipient MLD over the communication links to request the receiving status of transmitted MPDUs or A-MPDUs. Moreover, STAs affiliated with the recipient MLD send BA with status of received MPDU(s). Furthermore, STAs affiliated with the originator MLD retransmit missing MPDU(s) to STAs of the recipient MLD on the same link which indicates missing MPDU(s). However, if one of the enabled links is not reliable, such as having lower SINR, it would result in multiple retransmissions of missing MPDU(s) and delay of latency sensitive traffic when the retransmission persists on the unreliable link.

FIG. 1 illustrates an example architecture 100 with which various proposed schemes in accordance with the present disclosure may be implemented. Architecture 100 may support dynamic link selection for reliable retransmissions under the proposed schemes. Architecture 100 may be implemented in an originator/transmitter MLD and a recipient MLD in various proposed schemes described below with respect to FIG. 2~FIG. 12. When implemented in a transmitter MLD, an upper MAC sublayer of MLD may include a sequencing buffer that stores aggregated MAC service data unit (MSDU) received from a logical link control (LLC) sublayer. When implemented in a receiver MLD, the upper MAC sublayer of MLD may include a reordering buffer that stores received MSDUs from MLD lower MAC of MLD. The upper MAC sublayer of MLD may also include a BA scoreboard that maintains a full status of received MPDUs consolidated from link level BA scoreboards. Moreover, a lower MAC sublayer of MLD may also include a BA scoreboard that maintains a partial status of MPDUs received on the link (e.g., link level scoreboard).

Figure 2:
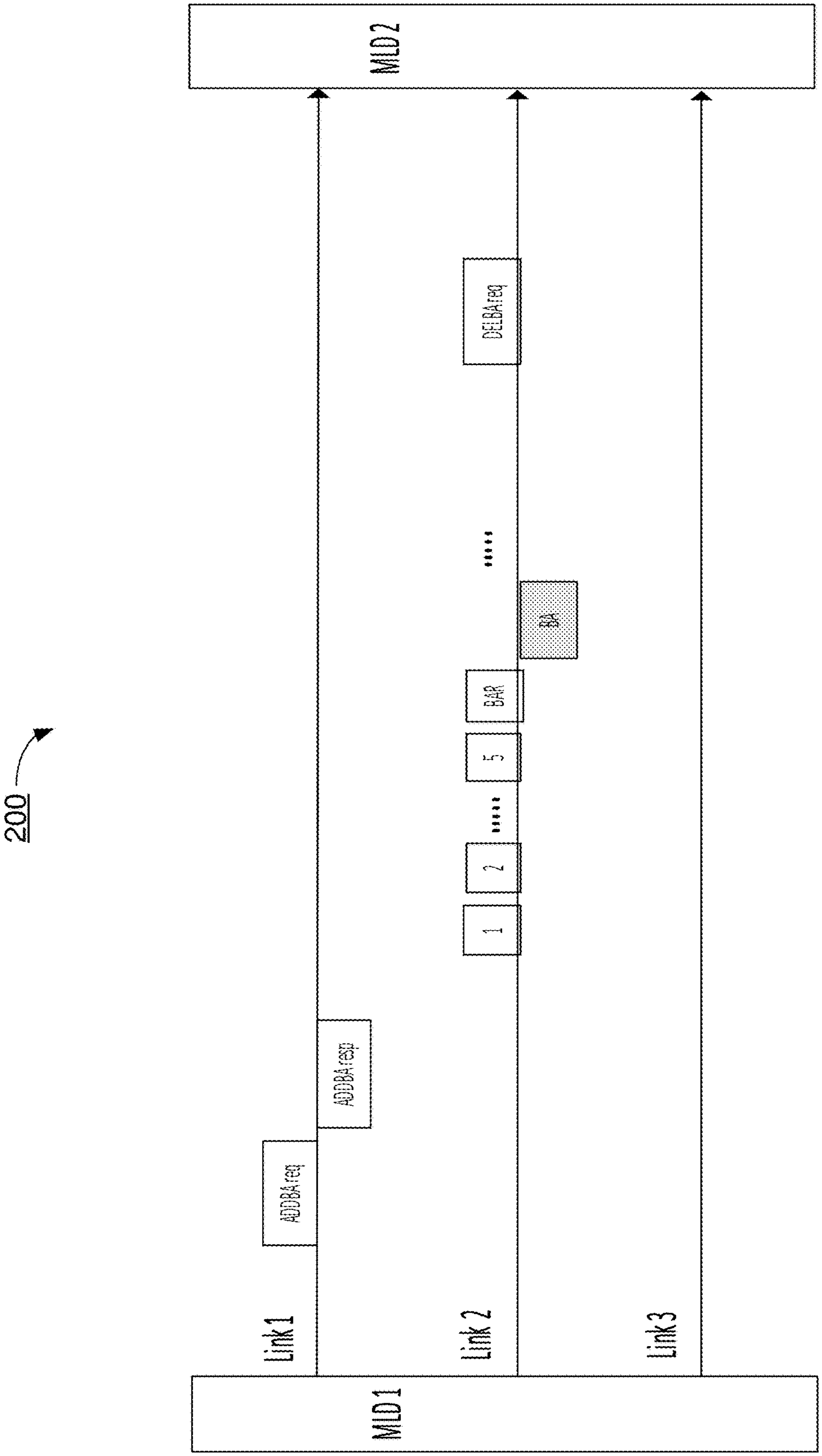
FIG. 2 is a diagram of an example scenario under a proposed scheme in accordance with the present disclosure.

FIG. 2 illustrates an example scenario 200 under a proposed scheme in accordance with the present disclosure. Scenario 200 may pertain to Block Ack agreement setup and Block Ack agreement termination. Referring to FIG. 2, with respect to Block Ack agreement setup, an originator MLD (MLD 1) may transmit an Add Block Ack (ADDBA) request to a recipient MLD (MLD 2) on any link among one or more enabled links (e.g., link 1 as shown in FIG. 2) to set up a Block Ack agreement between MLD 1 and MLD 2. Optionally, originator MLD 1 may request to set up a Protected Block Ack agreement through a robust ADDBA request message with the starting sequence number, if both MLD 1 and MLD 2 support Protected Block Ack capability. The recipient MLD 2 may transmit an ADDBA response to originator MLD 1 to accept the Block Ack agreement on the same link (e.g., link 1) on which the ADDBA request is received. In case that a valid robust ADDBA request frame is received, recipient MLD 2 may update its $WinStart_R$ and $WinStart_B$ values based on the starting sequence number in the robust ADDBA request frame. Optionally, the originator MLD and recipient MLD may setup one link dedicated to BA transmission between MLDs, and/or deferred retransmission in the Block Ack agreement. After a Protected Block Ack agreement is established, MLD 1 may not use the Block Ack Starting Sequence Control subfield value in the Block Ack request frame to update the values of $WinStart_R$ and $WinStart_B$. With respect to Block Ack agreement termination, either originator MLD 1 or recipient MLD 2 may initiate the Block Ack agreement termination. Upon establishment of the Block Ack agreement or Protected Block Ack agreement, MLD 1 and MLD 2 may exchange data packets, BAR and BA on at least one link among the one or more enabled links (e.g., link 2 as shown in FIG. 2). The originator MLD 1 may signal the end of its use of the Block Ack mechanism by sending a delete Block Ack (DELBA) frame to recipient MLD 2 to terminate the Block Ack agreement when the agreement is not needed or no frame exchange between MLD 1 and MLD 2 within a specified time period.

Figure 3:
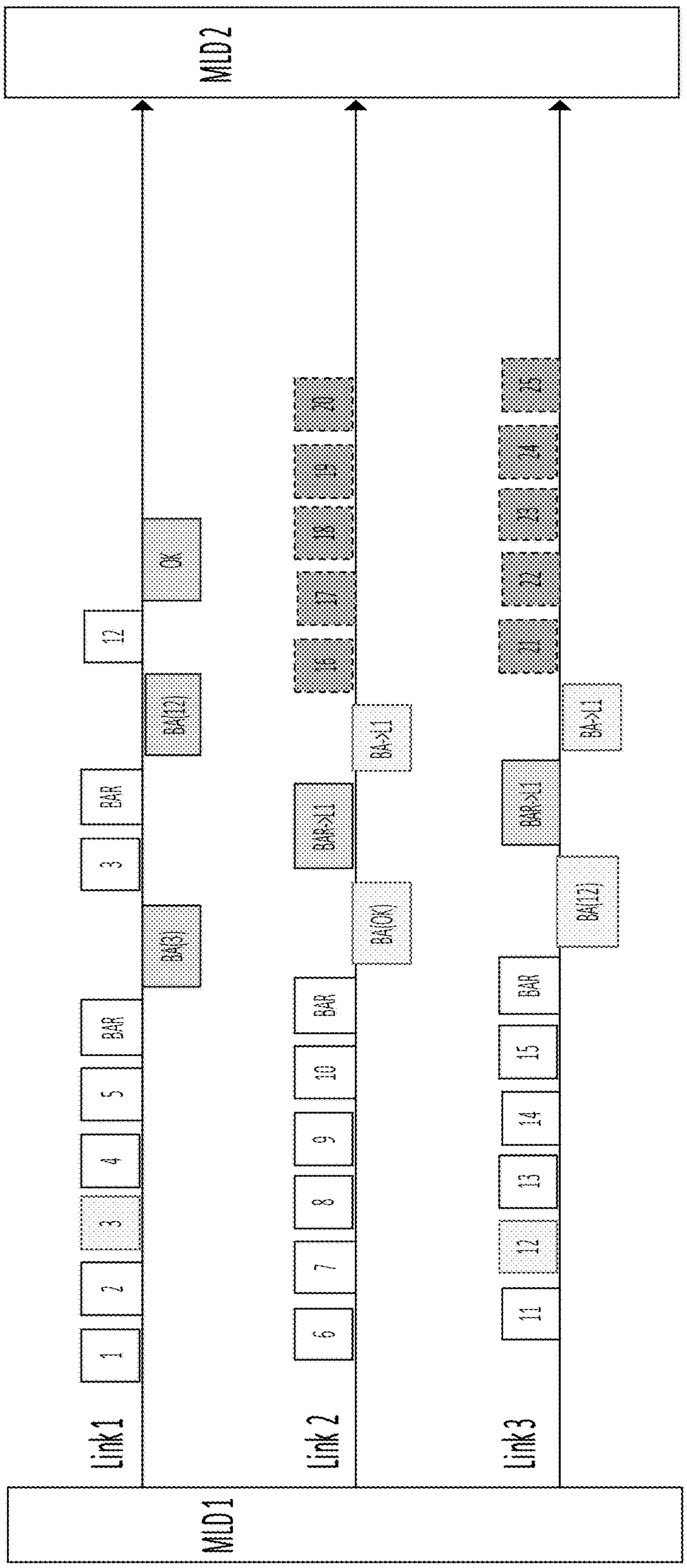
FIG. 3 is a diagram of an example scenario under a proposed scheme in accordance with the present disclosure.

FIG. 3 illustrates an example scenario 300 under a proposed scheme in accordance with the present disclosure. Scenario 300 may pertain to selection of a link for transmission (Tx) of a BA with consolidated receiving status. Referring to FIG. 3, an originator MLD (MLD 1) may start transmitting a MAC packet (e.g., MPDUs or A-MPDUs) over T2L mapped links (e.g., enabled links) to a recipient MLD (MLD 2). STAs of recipient MLD 2 may update the status for received MAC packet in scoreboards at link level. Also, STAs of originator MLD 1 may send a Block Ack request (BAR) and/or multi-link BAR (ML-BAR) to request receiving status of transmitted MAC packets on the corresponding link and/or other links. The recipient MLD 2 may send to originator MLD 1 on the same link a BA with status of received MAC packets on the corresponding link and/or other links. In case that a BA is received successfully, a STA of originator MLD 1 may retransmit the missing MPDU(s) on the same link to a STA of recipient MLD 2 according to the status of received MPDUs in the received BA. In case that a BA responding to the BAR is not received successfully, the STA affiliated with originator MLD1 may send another BAR with a recommended Link identifier (ID) to recipient MLD 2 to request the receiving status of transmitted MAC packets on the link to be included in the BA on the recommended Link. Moreover, the STA of recipient MLD 2 which receives the BAR consolidates the receiving status of received MAC packets in the link level scoreboard into MLD level scoreboard. The recipient MLD 2 may then send a BA with status of consolidated received MAC packets to originator MLD 1 on the recommended link. Furthermore, the STA of originator MLD 1 may retransmit the missing MAC packets, if any, on the same link to the STA of recipient MLD 2. Otherwise, the STA of originator MLD 1 may continue transmitting new MAC packets on the same link to the recipient MLD 2. Moreover, the originator MLD 1 may include in BAR(s) to the recipient MLD 2 the recommended link for the BA transmission from the recipient MLD 2 so as to avoid (re)transmission of BA on unreliable link(s). The originator MLD 1 may continue transmitting new MAC packets on other enabled links to help to improve the channel usage efficiency. If the originator MLD1 is aware of transmission of BA on a link not reliable, it may send a BAR to the recipient MLD 2 with a recommended Link ID to request a BA with the consolidated receiving status of transmitted MAC packets to be send on the recommended Link so as to avoid BA transmission and/or retransmission on the unreliable link.

Figure 4:
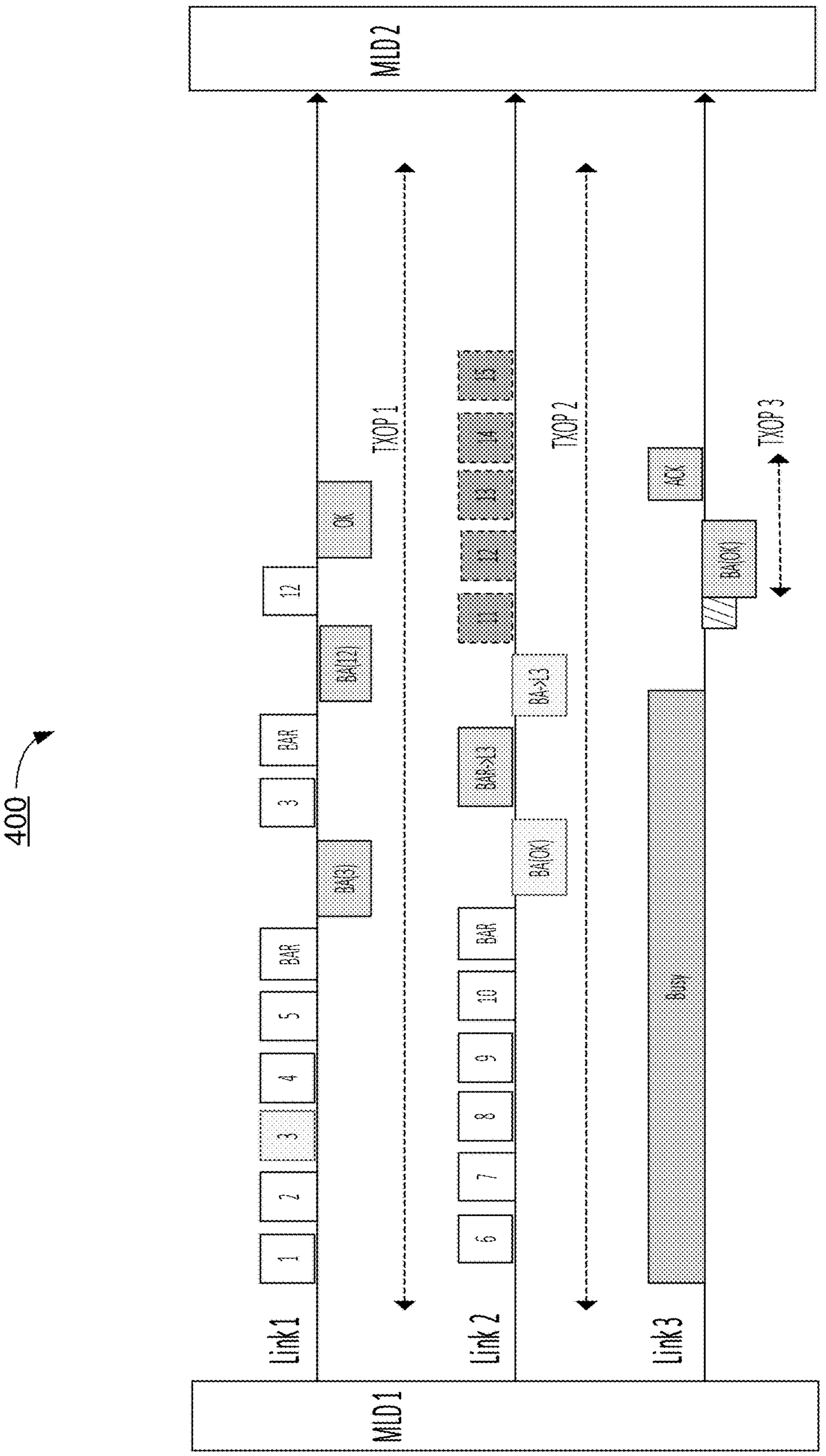
FIG. 4 is a diagram of an example scenario under a proposed scheme in accordance with the present disclosure.

FIG. 4 illustrates an example scenario 400 under a proposed scheme in accordance with the present disclosure. Scenario 400 may pertain to selection of a link without transmission opportunity (TXOP) for transmission of a BA with consolidated receiving status. Referring to FIG. 4, an originator MLD (MLD 1) may start transmitting a MAC packet (e.g., MPDUs or A-MPDUs) over T2L mapped links (e.g., a subset of enabled links) to a recipient MLD (MLD 2). STAs of recipient MLD 2 may update the status for received MAC packet in scoreboards at link level. STAs of originator MLD 1 may send a BAR/ML-BAR to request receiving status of transmitted MAC packets on the corresponding link and/or other links. In response, recipient MLD 2 may send to originator MLD 1 on the same link a BA with status of received MAC packets on the corresponding link and/or other links. In case that a BA is received successfully, a STA of originator MLD 1 may retransmit the missing MPDU(s) on the same link to STA of recipient MLD 2 according to the status of received MPDUs in the received BA. In case that a BA responding to the BAR is not received successfully, a STA affiliated with originator MLD1 may send another BAR with a recommended Link ID (e.g., in idle status) to recipient MLD 2 to request the BA including the receiving status of transmitted MAC packets on the link to be sent on the recommended Link. The STA of recipient MLD 2 which receives the BAR may consolidate the receiving status of received MAC packets in the link level scoreboard into MLD level scoreboard. In case that the recommended link is not set up for a TXOP, recipient MLD 2 may then send a BA with consolidated status of received MAC packets to originator MLD 1 on the recommended link after performing enhanced distributed channel access (EDCA) and after the TXOP is set up. The STA of originator MLD 1 may retransmit the missing MAC packets on the same link to the STA of recipient MLD 2. In that the STA affiliated with originator MLD1 received a BA on the recommended link, that STA may continue transmitting new MAC packets or respond with an acknowledgement (ACK) if no missing MAC packet is reported in the BA; otherwise, the STA may retransmit the missing MAC packets according to the status of received MPDUs in the received BA. The originator MLD 1 may continue transmitting new MAC packets on other links, which may help to improve the channel usage efficiency.

Figure 5:
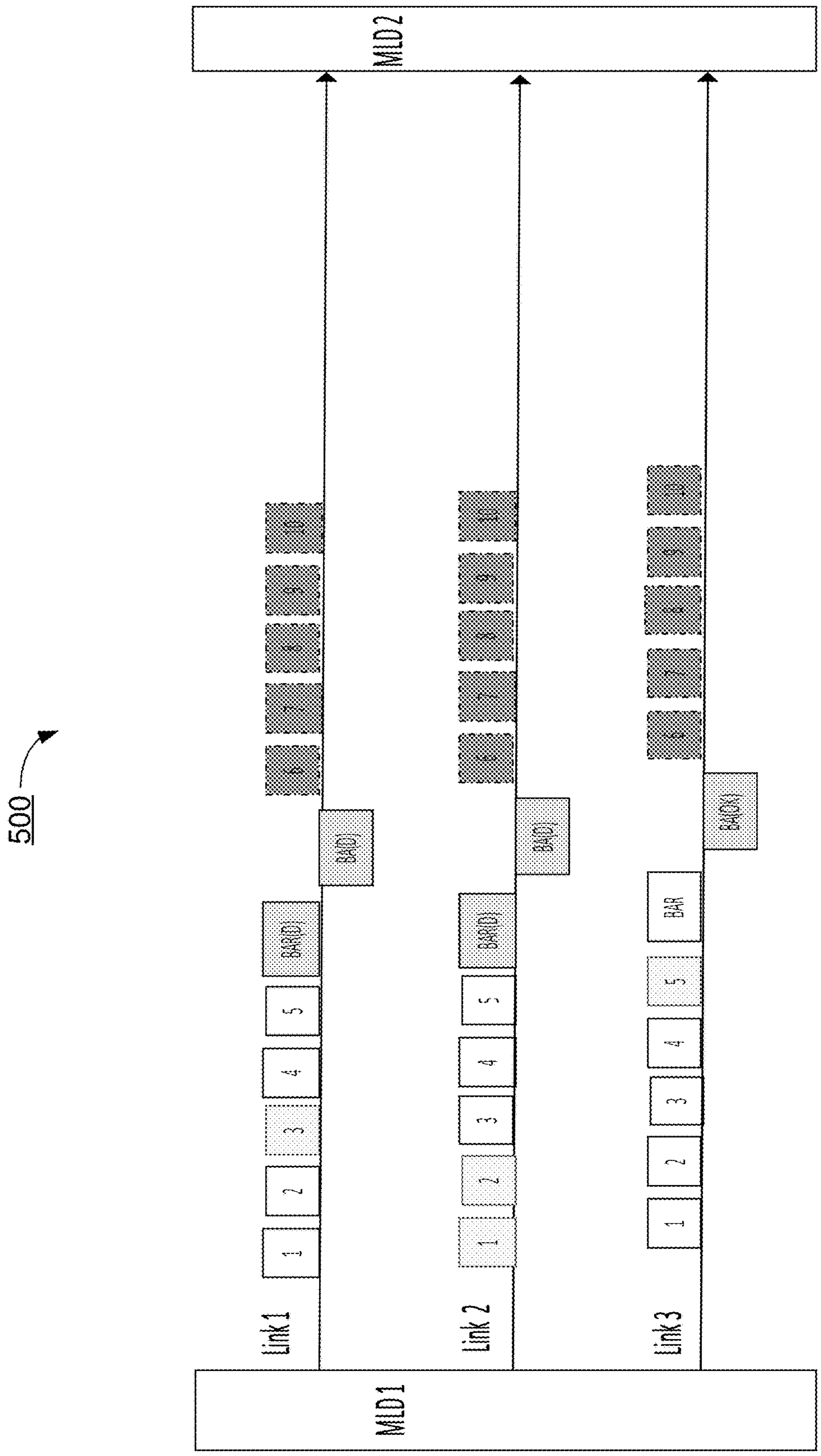
FIG. 5 is a diagram of an example scenario under a proposed scheme in accordance with the present disclosure.

FIG. 5 illustrates an example scenario 500 under a proposed scheme in accordance with the present disclosure. Scenario 500 may pertain to selection of a link for transmission of a BA with consolidated status to respond to duplicate transmissions. Referring to FIG. 5, the upper MAC sublayer of an originator MLD (MLD 1) may duplicate MSDUs and may distribute MPDUs or A-MPDUs to affiliated STAs for transmission reliability improvement. The affiliated STAs may then transmit duplicated MAC packets (e.g., MPDUs, or A-MPUDs) to STAs affiliated with a recipient MLD (MLD 2) on corresponding enabled links. STAs affiliated with recipient MLD 2 may update the status for received MAC packets on corresponding links in their link level scoreboards. The originator MLD 1 may send a BAR (or ML-BAR) with deferred retransmission indication (DRTI) to recipient MLD 2 to indicate deferral of the retransmission and to request consolidation of receiving status of transmitted MAC packets on corresponding links. A STA of recipient MLD 2 which receives the BAR/ML-BAR with DTRI may consolidate status of received MAC packets at link level scoreboard into MLD level scoreboard. That STA may then send to originator MLD 1 on the same link a BA with acknowledgement to DRTI with full status of received MAC packets consolidated at upper MAC or partial status of received MAC packets on its link. In case that the deferred retransmission is set up on a link (e.g., link 1 or 2), originator MLD 1 may continue transmitting new MAC packets on the same link, if needed. In case that the deferred retransmission is not set up on a link (e.g., link 3), and at least one missing MAC packet is indicated in BA, originator MLD 1 may instruct an affiliated STA to retransmit the missing MAC packet(s) to recipient MLD 2 on the same link. After a packet is delivered to the recipient MLD2 successfully or beyond the setup delivery time, the originator MLD 1 may release the transmitted MAC packet from the sequencing buffer and the recipient MLD 2 may forward the received MAC packet to the upper layer and clean up status of received MAC packet.

Figure 6:
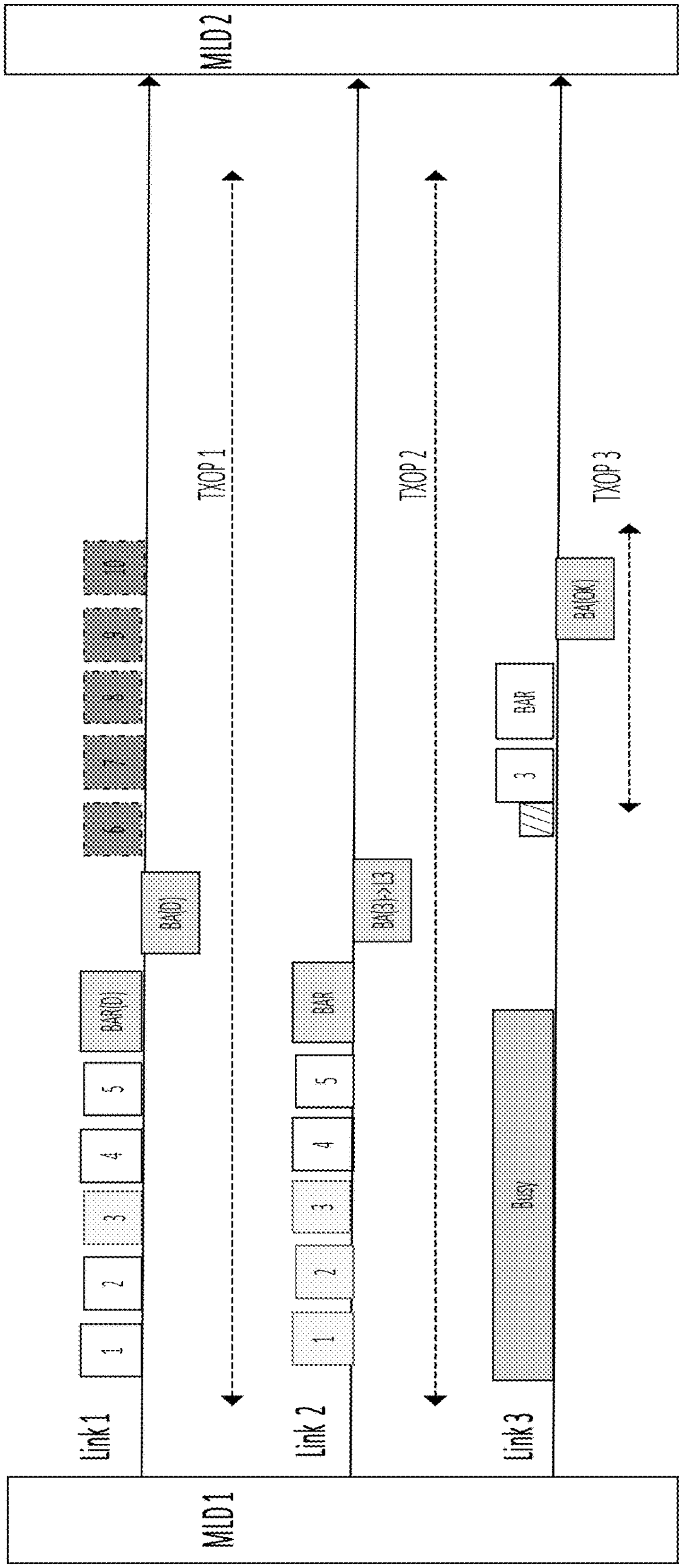
FIG. 6 is a diagram of an example scenario under a proposed scheme in accordance with the present disclosure.

FIG. 6 illustrates an example scenario 600 under a proposed scheme in accordance with the present disclosure. Scenario 600 may pertain to selection of a link without TXOP for transmission of a BA with consolidated status to respond to duplicate transmissions. Referring to FIG. 6, the upper MAC sublayer of an originator MLD (MLD 1) may duplicate MSDUs and may distribute MPDUs or A-MPDUs to affiliated STAs for transmission reliability improvement. The affiliated STAs may then transmit duplicated MAC packets (e.g., MPDUs, or A-MPUDs) to STAs affiliated with a recipient MLD (MLD 2) on corresponding enabled links. After receiving the MAC packets, STAs affiliated with recipient MLD 2 may update the status for received MAC packets on corresponding links in their link level scoreboards. The originator MLD 1 may send a BAR (or ML-BAR) with a DRTI to recipient MLD 2 to indicate deferral of the retransmission and to request consolidation of receiving status of transmitted MAC packets on corresponding links. A STA of recipient MLD 2 which receives the BAR with DTRI may consolidate status of received MAC packets at link level scoreboard into MLD level scoreboard. That STA may then send to originator MLD 1 on the same link a BA with acknowledgement to DRTI with full status of received MAC packets consolidated at upper MAC or partial status of received MAC packets on its link. In case that the deferred retransmission is set up on a link (e.g., link 1), originator MLD 1 may continue transmitting new MAC packets on the same link, if needed. In case that the deferred retransmission is not set up on a link (e.g., link 2), and at least one missing MAC packet is indicated in BA, if a recommended link (e.g., link 3) is included in the BA, originator MLD 1 may instruct the corresponding affiliated STA to retransmit missing MAC packet(s) to recipient MLD 2 on the recommended link. In case that the TXOP is not set up on the recommended link yet between originator MLD 1 and recipient MLD2, the affiliated STA with originator MLD 1 may retransmit missing MAC packet(s) after performing EDCA and after the TXOP is set up. After a packet is delivered to the recipient MLD2 successfully or beyond the setup delivery time, the originator MLD 1 may release the transmitted MAC packet from the sequencing buffer and the receiving MLD 2 may forward the received MAC packet to the upper layer and clean up status of received MAC packet.

Figure 7:
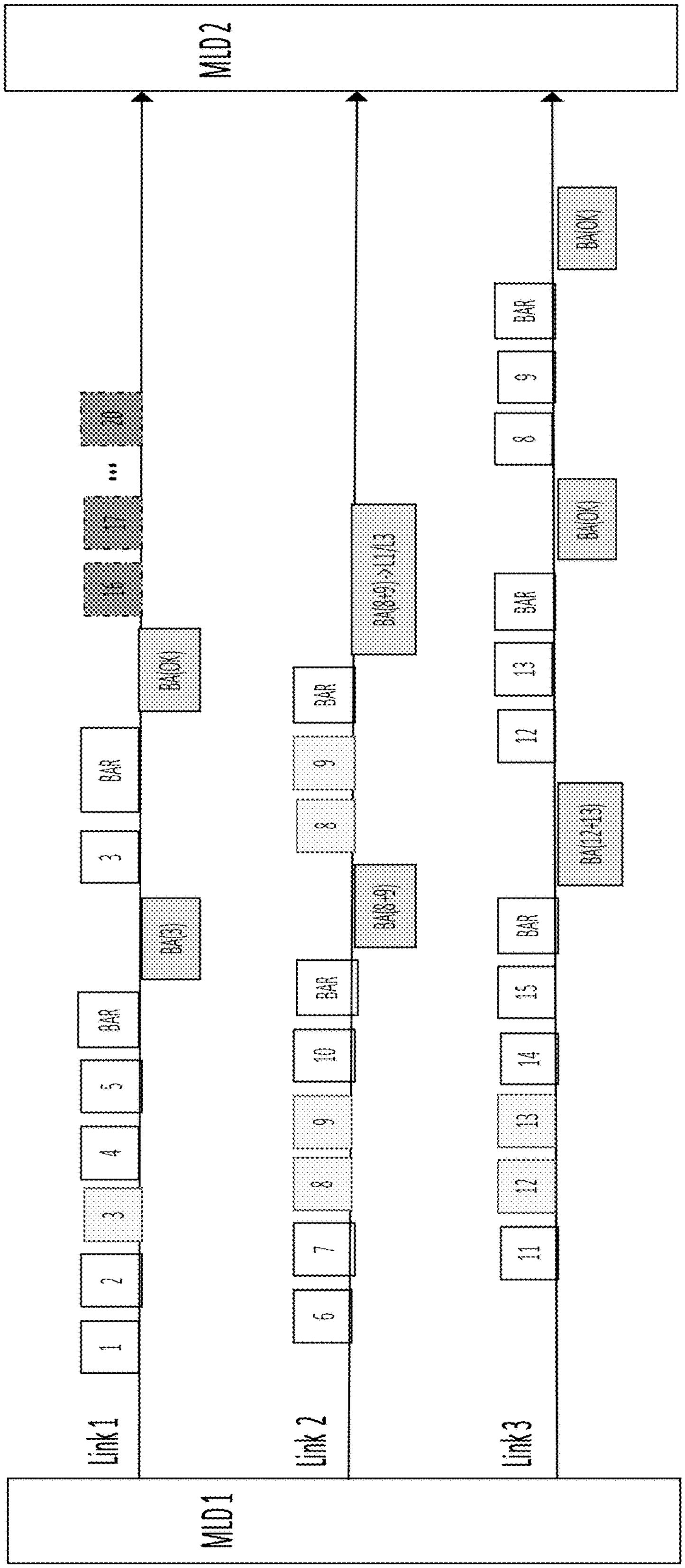
FIG. 7 is a diagram of an example scenario under a proposed scheme in accordance with the present disclosure.

FIG. 7 illustrates an example scenario 700 under a proposed scheme in accordance with the present disclosure. Scenario 700 may pertain to recommendation of a link for retransmission of missing MPDUs by a recipient. Referring to FIG. 7, an originator MLD (MLD 1) may start transmitting MAC packets (e.g., MPDUs or A-MPDUs) to a recipient MLD (MLD 2) over enabled links mapped by traffic identifier (TID)-to-link mapping (T2LM). STAs of recipient MLD 2 may update the status of received MAC packets in corresponding scoreboards at link level. STAs of originator MLD 1 may send a BAR/ML-BAR to request reception status of transmitted MAC packets on the corresponding link and/or other links. In case that a BAR/ML-BAR is received successfully, a STA affiliated with recipient MLD 2 may send to originator MLD 1 on the same link a BA with status of received MAC packets on the corresponding link and/or other links. Optionally, a STA of recipient MLD 2 may send to originator MLD 1 on a BA with status of received MAC packets together with a recommended Link ID to request the retransmission of missing MAC packets on the recommended link and/or RSSI information, if the current link is determined unreliable for receiving MAC packets (e.g., the number of missing MAC packets or the number of BAs about re-transmitting the missing MAC packets on the same link is beyond a given threshold). In case that recipient MLD 2 requests originator MLD 1 to retransmit missing MAC packets on recommended links, recipient MLD 2 may reset the reception status of scoreboard on the recommended link(s) with the reception status of MLD level scoreboard. The recipient MLD 2 may update $\text{WinStart}_R$ of scoreboard context control on the recommended link with $\text{WinStart}_B$ of the receiving reordering buffer control. This may avoid retransmission of MAC packets on the recommended link being discarded. The originator MLD 1 which receives the BA may instruct the affiliated STA to retransmit the missing MAC packets to recipient MLD 2 on the recommended link. Optionally, originator MLD 1 may continue transmitting one or more new MAC packets to recipient MLD 2 on the recommended link.

Figure 8:
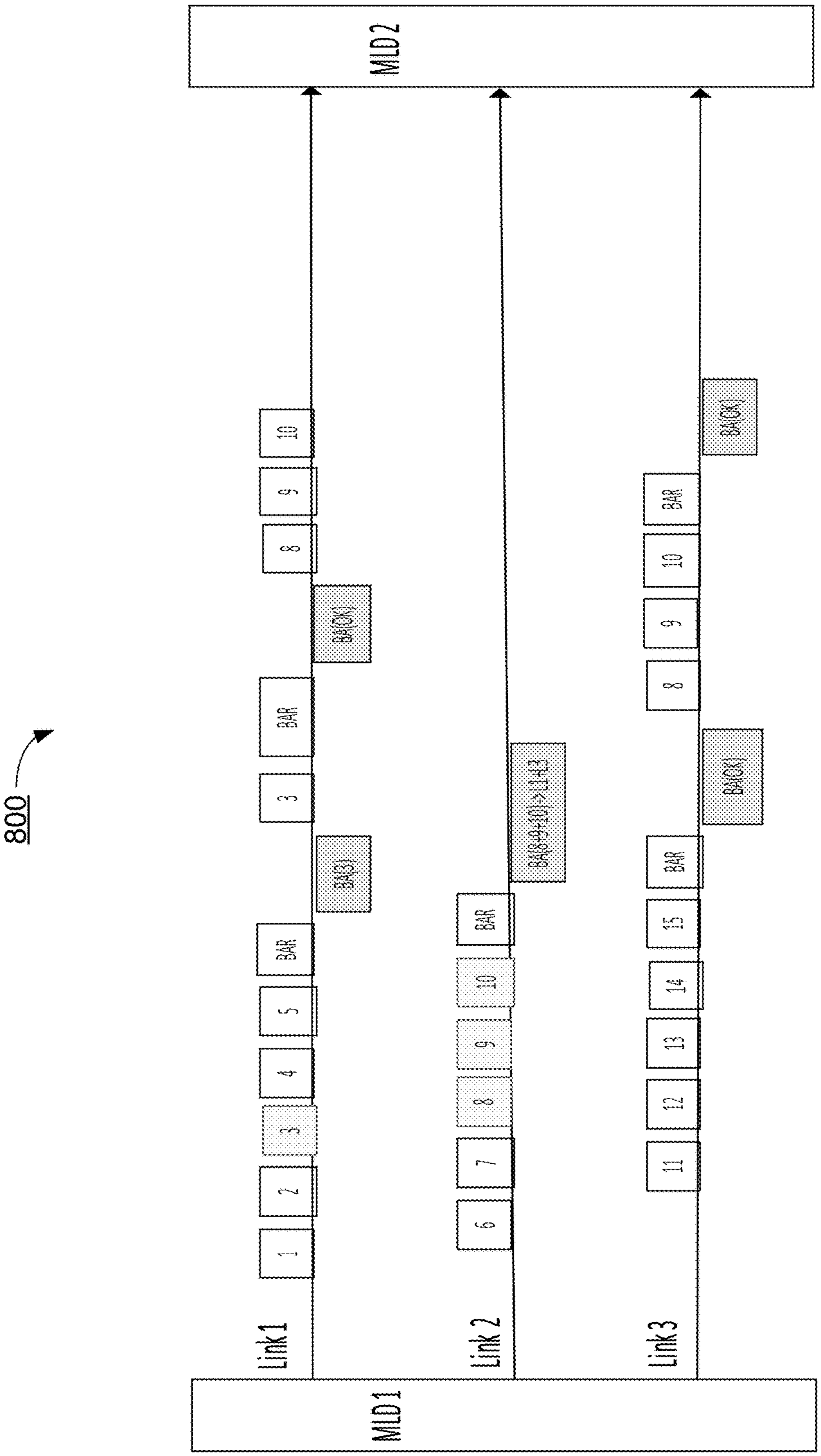
FIG. 8 is a diagram of an example scenario under a proposed scheme in accordance with the present disclosure.

FIG. 8 illustrates an example scenario 800 under a proposed scheme in accordance with the present disclosure. Scenario 800 may pertain to recommendation of links for duplicating retransmission of missing MPDUs by a recipient. Referring to FIG. 8, an originator MLD (MLD 1) may start transmitting MAC packets (e.g., MPDUs or A-MPDUs) to a recipient MLD (MLD 2) over enabled links mapped by T2LM. STAs of recipient MLD 2 may update the status for received MAC packets at corresponding link level scoreboards. STA of originator MLD 1 may send a BAR/ML-BAR to request receiving status of transmitted MAC packets on the corresponding link and/or other enabled links mapped by T2LM. A STA of recipient MLD 2 which receives the BAR/ML-BAR may consolidate status of received MAC packets on its link level scoreboard into MLD level scoreboard, and then may send to originator MLD 1 on the same link a BA with status of received MAC packets on the corresponding link and/or other links. Optionally, the STA of recipient MLD 2 may send to originator MLD 1 on the corresponding link a BA including status of received MAC packets together with recommended Link ID(s) and/or RSSI information to request the retransmission of missing MAC packets on the recommended links, if the current link is determined unreliable for receiving MAC packets. The recipient MLD 2 may update $WinStart_R$ of scoreboard context control on the recommended link with $WinStart_B$ of the receiving reordering buffer control. This may avoid retransmission of MAC packets on the recommended link being discarded. The originator MLD 1 which receives the BA may duplicate missing MAC packets and may instruct corresponding affiliated STAs to retransmit them to recipient MLD 2 on recommended links. The recipient MLD 2 may receive retransmitted missing MAC packets on recommended links and may consolidate status of recipient links. The recipient MLD 2 may also respond to a BAR with consolidated status in BA. Optionally, originator MLD 1 may continue transmitting one or more new MAC packets to recipient MLD 2 on the recommended links.

Figure 9:
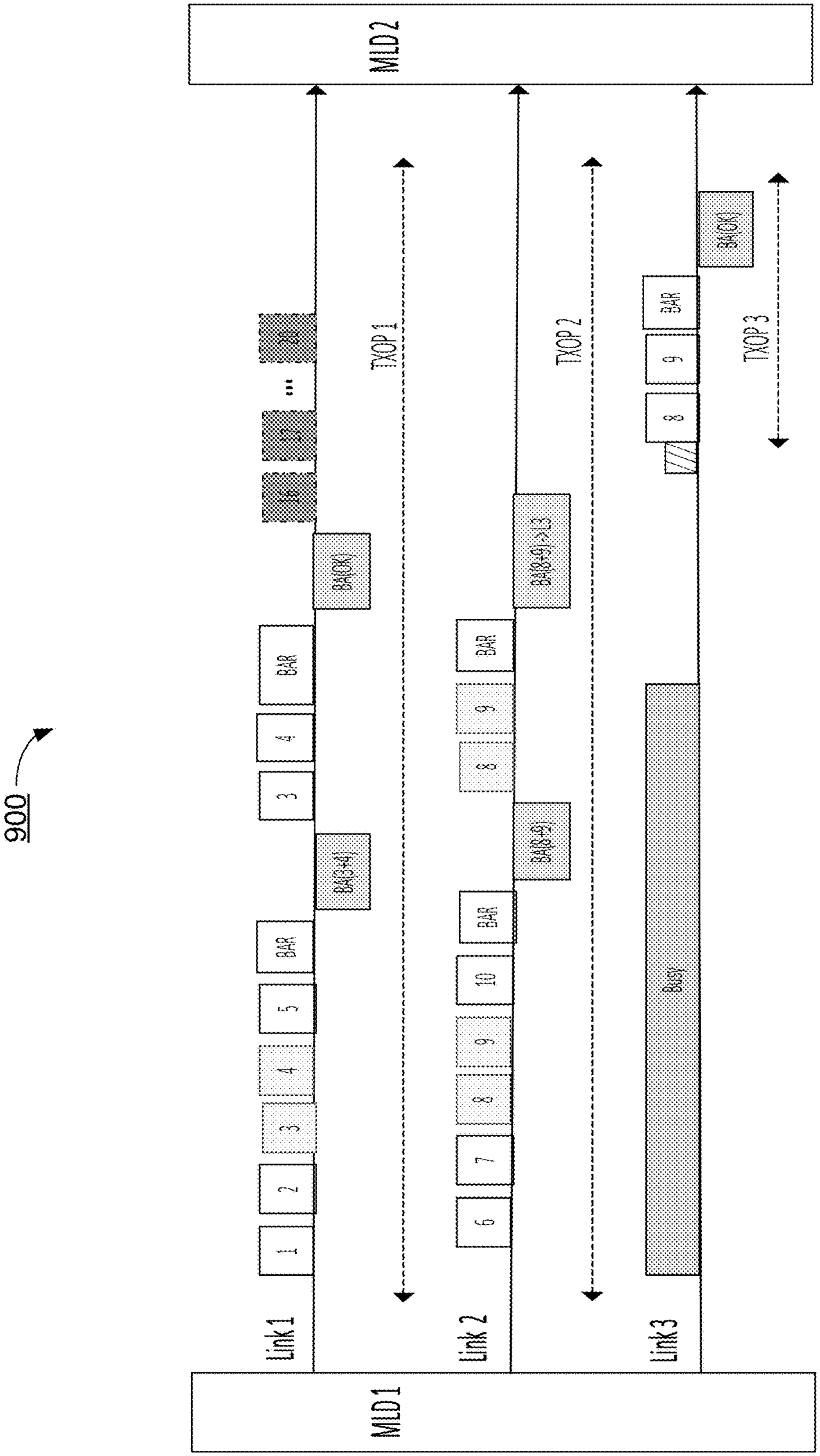
FIG. 9 is a diagram of an example scenario under a proposed scheme in accordance with the present disclosure.

FIG. 9 illustrates an example scenario 900 under a proposed scheme in accordance with the present disclosure. Scenario 900 may pertain to recommendation of a link without a TXOP for retransmission of mixing MPDUs by a recipient. Referring to FIG. 9, an originator MLD (MLD 1) may start transmitting MAC packets (e.g., MPDUs or A-MPDUs) to a recipient MLD (MLD 2) over a subset of enabled links (e.g., link 1 and 2 when link 3 is busy). STAs affiliated with recipient MLD 2 may update the status of received MAC packets in corresponding scoreboards at link level. STAs affiliated with originator MLD 1 may send a BAR/ML-BAR to request reception status of transmitted MAC packets on the corresponding link and/or other links. In case that a BAR/ML-BAR is received successfully, a STA affiliated with recipient MLD 2 may send to originator MLD 1 on the same link a BA with status of received MAC packets on the corresponding link and/or other links. Optionally, the STA affiliated with recipient MLD 2 may send to originator MLD 1 on the same link a BA with status of received MAC packets together with a recommended Link ID and/or RSSI information to request the retransmission of missing MAC packets on the recommended link (e.g., in idle status), if the current link is determined unreliable for receiving MAC packets (e.g., the number of missing MAC packets or the number of BAs about retransmitting the missing MAC packets on the same link is beyond a given threshold). In case that recipient MLD 2 recommends originator MLD 1 to retransmit missing MAC packets on recommended links, recipient MLD 2 may reset the reception status of scoreboard on the recommended link(s) with the reception status of MLD level scoreboard. The recipient MLD 2 may update $WinStart_R$ of scoreboard context control on the recommended link with $WinStart_B$ of the receiving reordering buffer control. This may avoid retransmission of MAC packets on the recommended link being discarded. In case that a STA affiliated with originator MLD 1 receives the BA with recommended link with no TXOP setup, that STA may retransmit the missing MAC packets to recipient MLD 2 on the recommended link after performing EDCA and after the TXOP is set up.

Figure 10:
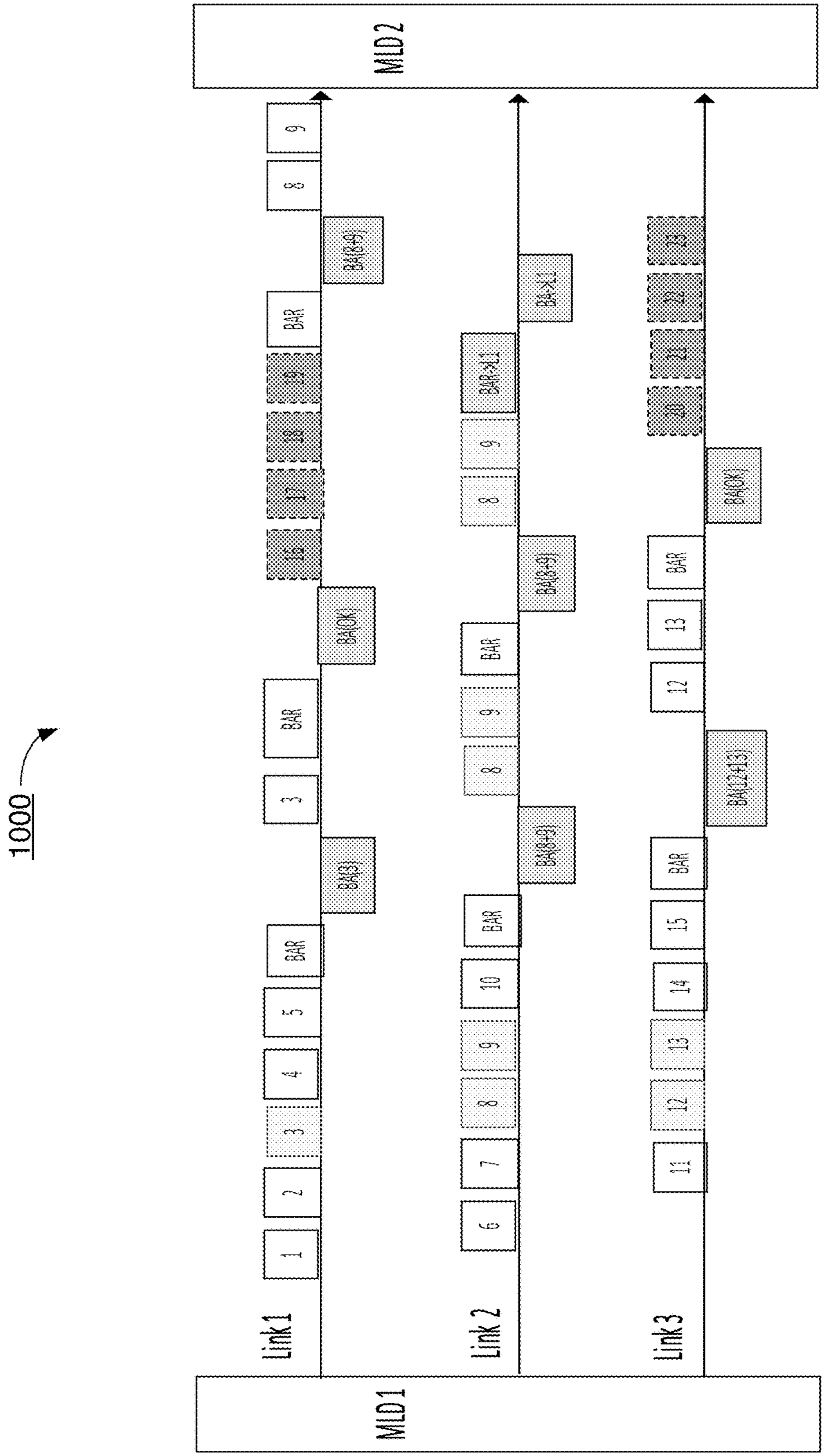
FIG. 10 is a diagram of an example scenario under a proposed scheme in accordance with the present disclosure.

FIG. 10 illustrates an example scenario 1000 under a proposed scheme in accordance with the present disclosure. Scenario 1000 may pertain to selection of a link for retransmission of missing MPDUs by an originator. Referring to FIG. 10, an originator MLD (MLD 1) may start transmitting MAC packets to recipient MLD 2 over enabled links mapped by T2LM. STAs of recipient MLD 2 may update the status of received MAC packets in corresponding scoreboards at link level. STAs of originator MLD 1 may send a BAR/ML-BAR to request reception status of transmitted MAC packets on the corresponding link and/or other links. In case that a BAR/ML-BAR is received successfully, a STA affiliated with recipient MLD 2 may send to originator MLD 1 on the same link a BA with status of received MAC packets on the corresponding link and/or other links. The originator MLD 1 may determine the retransmission reliability of a link based on the number of BAs for retransmission of missing MAC packets on that link and may determine different link(s) for the retransmission of missing MAC packets. A STA affiliated with originator MLD 1 may transmit a BAR/ML-BAR with a recommended Link ID to recipient MLD 2 to request the receiving status of transmitted MAC packets on the link to be included in the BA transmitted on the recommended Link. A STA affiliated with recipient MLD 2 which receives the BAR may respond with BA on the same link to agree with the retransmission on other link and may then consolidate the receiving status of transmitted MAC packets in the link level scoreboard into MLD level scoreboard. The recipient MLD 2 may update $WinStart_R$ of scoreboard context control on the recommended link with $WinStart_B$ of the receiving reordering buffer control, which may avoid retransmission of MAC packets on the recommended link being discarded. Then the recipient MLD 2 may send a BA with status of consolidated received MAC packets to originator MLD 1 on the recommended link. The originator MLD 1 may retransmit missing MAC packets on recommended link according to the status of received MPDUs in the received BA.

Figure 11:
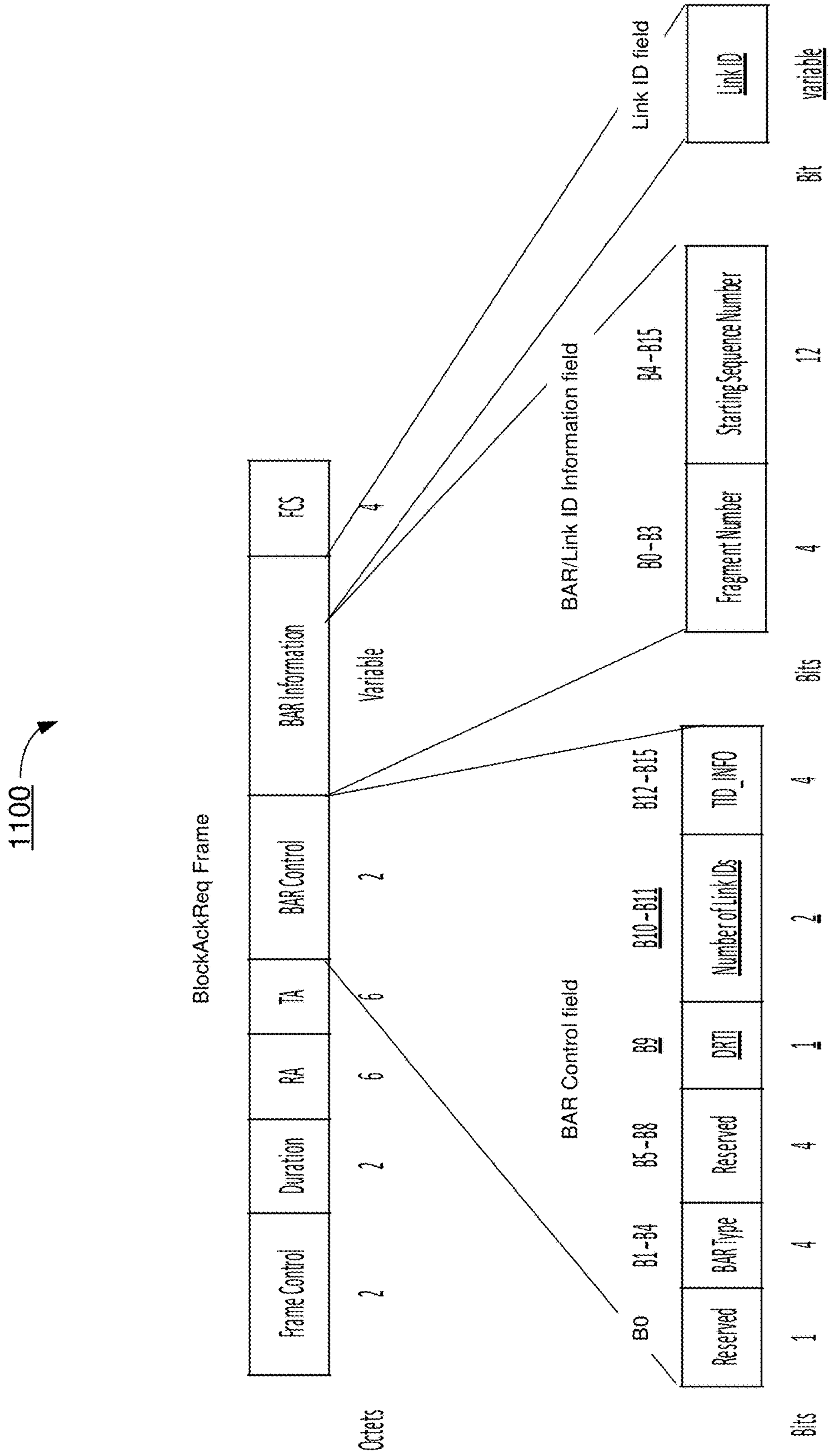
FIG. 11 is a diagram of an example design under a proposed scheme in accordance with the present disclosure.

FIG. 11 illustrates an example design 1100 under a proposed scheme in accordance with the present disclosure. Design 1100 may pertain to a block acknowledgement request (BlockAckReq) or multi-link block acknowledgement request (ML-BlockAckReq). Referring to FIG. 11, the BlockAckReq (or ML-BlockAckReq) under the proposed scheme may contain a number of fields including, for example, a receiver address (RA) field, a transmitter address (TA) field, a BAR Control field and a BAR/Link ID Information field. The RA field may be set to the address of the recipient STA. The TA field may be set to the address of the transmitting STA. The BAR Control field may, among other subfields, indicate a DRTI subfield and a Number of Link IDs subfield. The DTRI subfield may be set to 1 to indicate deferred retransmission; otherwise, the DTRI subfield may be set to 0. The Number of Link IDs subfield may be set to the number of Link ID(s) (0~2) to be included in BlockAckReq. The Link ID may indicate the link(s) among a set of enabled links over which a BlockAck is to be sent by the recipient MLD in response to a BAR. In case that the Number of Link IDs subfield is set to a non-zero value, the recipient MLD may consolidate status of received MPDUs in link level scoreboard into the MLD level. Also, a value of this subfield may be set to 3 to indicate the deferred retransmission. The BAR/Link ID Information field may include link ID(s). That is, if the Number of Link IDs subfield is not equal to "0", the BAR/Link ID Information field may include one or more link ID subfields, the quantity of which is specified by the Number of Link IDs subfield. Otherwise, the Link ID subfield may not be included.

Figure 12:
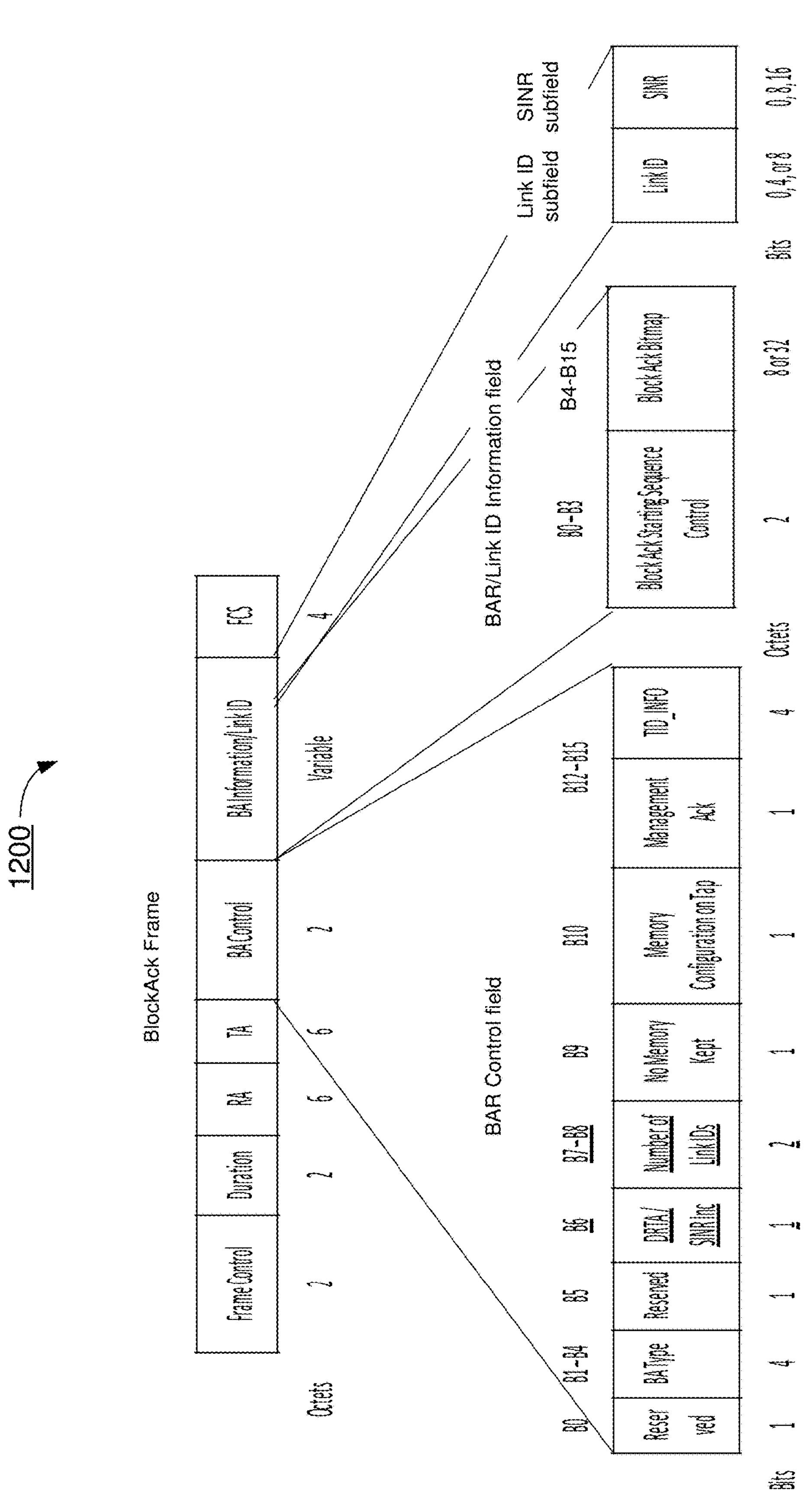
FIG. 12 is a diagram of an example design under a proposed scheme in accordance with the present disclosure.

FIG. 12 illustrates an example design 1200 under a proposed scheme in accordance with the present disclosure. Design 1200 may pertain to a block acknowledgement (BlockAck) or multi-link block acknowledgement (ML-BlockAck). Referring to FIG. 12, the BlockAck (or ML-BlockAck) under the proposed scheme may contain a number of fields including, for example, a RA field, a TA field, a BA Control field and a BA/Link ID Information field. The RA field may be set to the address of the recipient STA. The TA field may be set to the address of the transmitting STA. The BA Control field may, among other subfields, indicate a DRTA/SINR Inc subfield and a Number of Link IDs subfield. The DTRA/SINR Inc subfield may pertain to deferred retransmission acknowledgement and may be set to 1 to indicate acknowledgement to a deferred retransmission or to indicate that a SINR subfield is included in the BlockAck. Otherwise, this subfield may be set to 0. The Number of Link IDs subfield may be set to a number (0~2) of Link ID subfields included in BA/Link ID Information field. The Link ID indicates the link(s) among a set of enabled links over which retransmission is to be sent by the originator MLD in response to the BA. A value of this subfield may be set to 3 to indicate the deferred retransmission acknowledgement. The BA/Link ID Information field may include Compressed BA, Multi-TID BA or other variant subfields. Moreover, the BA/Link ID Information field may include a Link ID subfield and a SINR subfield. In case that the Number of Link IDs subfield is not equal to "0", the Link ID subfield may include one or more link IDs, the quantity of which is specified by the Number of Link Ids subfield. Otherwise, this subfield may not be included. In case that the Number of Link IDs subfield is equal to "0" and the DRTA/SINR Inc subfield is set to "1", the SINR subfield may include the signal-to-interference-and-noise ratio (SINR) corresponding to the current receiving link. In case that the Number of Link Ids subfield is not equal to "0" and the DRTA/SINR Inc subfield is set to "1", the SINR subfield may include one or more SINRs for corresponding links, the quantity of which are specified by the Number of Link IDs subfield. Otherwise, this subfield may not be included.

Accordingly, under various proposed schemes in accordance with the present disclosure with respect to improving reliability in transmission and retransmission, an MLD may transmit an ADDBA request to another MLD to set up a Block Ack agreement or Protected Block Ack agreement between the two MLDs for dynamic link selection. Additionally, under various proposed schemes in accordance with the present disclosure with respect to improving reliability in transmission and retransmission, an originator MLD may transmit a data packet followed by a BAR on one or more enabled links. Additionally, under various proposed schemes in accordance with the present disclosure with respect to improving reliability in transmission and retransmission, a recipient MLD may select and transmit on a link a Block Ack with consolidated receiving status to an originating MLD in response to a BAR from the originating MLD. In such cases, the originating MLD and recipient MLD may have set up the Block Ack agreement for dynamic link selection, and the selected link for transmitting the Block Ack may be among those ongoing communication links protected by a current TXOP. In such cases, the ongoing communication links may be protected by the current TXOP for a period reserved for transmission between the originating MLD and the recipient MLD on the link which is selected. Alternatively, or additionally, the recipient MLD may select and transmit on a link a Block Ack with consolidated receiving status to the originating MLD in response to the BAR from the originating MLD. In such cases, the originating MLD and recipient MLD may have set up the Block Ack agreement for dynamic link selection, and the selected link for transmitting the Block Ack may not be among the ongoing communication links protected by the current TXOP. Still alternatively, or additionally, the recipient MLD may select and transmit on a link a Block Ack with consolidated receiving status to the originating MLD in response to data packets received from the originating MLD. In such cases, the originating MLD and recipient MLD may have set up the Block Ack agreement for dynamic link selection, and the selected link for transmitting the Block Ack may be among the ongoing communication links protected by the current TXOP.

Under various proposed schemes in accordance with the present disclosure with respect to improving reliability in transmission and retransmission, a recipient MLD may transmit on a link a Block Ack with consolidated receiving status to an originating MLD in response to a BAR with deferred retransmission indication. In such cases, the originating MLD and recipient MLD may have set up a Block Ack agreement for dynamic link selection, and the Block Ack may be transmitted on an ongoing communication link protected by a current TXOP. Alternatively, or additionally, the recipient MLD may transmit on a link a Block Ack with consolidated receiving status to the originating MLD in response to the BAR with deferred retransmission indication. In such cases, the originating MLD and recipient MLD may have set up the Block Ack agreement for dynamic link selection, and the Block Ack may be transmitted on a link not protected by the current TXOP.

Under various proposed schemes in accordance with the present disclosure with respect to improving reliability in transmission and retransmission, a recipient MLD may transmit on a link a Block Ack with consolidated receiving status to an originating MLD in response to a BAR. In such case, the originating MLD and recipient MLD may have set up a Block Ack agreement for dynamic link selection, and the Block Ack transmitted on a link protected by a current TXOP may indicate a recommended link for retransmitting any missing data packet. The recommended link may be an ongoing communication link protected by the current TXOP. Responsive to receiving the Block Ack with recommended link(s) for retransmission, the originator MLD may retransmit missing data packets to the recipient MLD on the recommended link(s). Alternatively, or additionally, the recipient MLD may transmit on a link a Block Ack with consolidated receiving status to the originating MLD in response to the BAR. In such cases, the originating MLD and recipient MLD may have set up the Block Ack agreement for dynamic link selection, and the Block Ack transmitted on a link protected by the current TXOP may indicate a recommended link for retransmitting any missing data packet. The recommended link may not be an ongoing communication link protected by the current TXOP. Responsive to receiving the Block Ack with recommended link(s) for retransmission, the originator MLD may retransmit missing data packets to the recipient MLD on the recommended link(s) after access to the medium on the recommended link is successfully acquired or obtained.

Under various proposed schemes in accordance with the present disclosure with respect to improving reliability in transmission and retransmission, a recipient MLD may transmit on a link a Block Ack with consolidated receiving status to an originating MLD in response to a BAR. In such cases, the originating MLD and recipient MLD may have set up a Block Ack agreement for dynamic link selection, and the Block Ack transmitted on a link protected by a current TXOP may indicate one or more recommended links for duplicating retransmission of any missing data packet. The recommended links may be among the ongoing communication links protected by the current TXOP. Responsive to receiving the Block Ack with recommended links for duplicating retransmissions, the originator MLD may duplicate retransmission of missing data packets to the recipient MLD on the recommended links. Alternatively, or additionally, the recipient MLD may transmit on a link a Block Ack with consolidated receiving status to the originating MLD in response to the BAR. In such cases, the originating MLD and recipient MLD may have set up the Block Ack agreement for dynamic link selection, and the Block Ack transmitted on a link protected by the current TXOP may indicate one or more recommended links for duplicating retransmission of any missing data packet. The recommended links may not be in the ongoing communication links protected by the current TXOP. Responsive to receiving the Block Ack with recommended links for duplicating retransmissions, the originator MLD may duplicate retransmission of missing data packets to the recipient MLD after access to the media on the recommended links are successfully acquired or obtained.

Under various proposed schemes in accordance with the present disclosure with respect to improving reliability in transmission and retransmission, an originator MLD may transmit on a link a BAR to a recipient MLD. In such cases, the originating MLD and recipient MLD may have set up a Block Ack agreement for dynamic link selection, and the BAR transmitted on a link protected by a current TXOP may indicate one or more recommended links for retransmission of any missing data packet. The recommended link(s) may be among the ongoing communication links protected by the current TXOP. Responsive to receiving the BAR with recommended links for retransmissions, the recipient MLD may respond with a Block Ack with confirmation of the recommended link(s) for retransmitting missing data packets. Alternatively, or additionally, the originator MLD may transmit on a link a BAR to the recipient MLD. In such cases, the originating MLD and recipient MLD may have set up the Block Ack agreement for dynamic link selection, and the BAR transmitted on a link protected by the current TXOP may indicate one or more recommended links for retransmission of any missing data packet. The recommended link(s) may not be among the ongoing communication links protected by the current TXOP. Responsive to receiving the BAR with recommended link(s) for retransmissions, the recipient MLD may respond with a Block Ack with confirmation of the recommended link(s) for retransmitting missing data packets.

In view of the above, a plethora of benefits of dynamic link selection for reliable retransmissions under various proposed schemes in accordance with the present disclosure may be summarized below. Firstly, the proposed schemes leverage advantages of MLO to improve retransmission reliability, especially for latency-sensitive traffic, based on real-time status of received MPDUs on enabled links at a recipient MLD and/or recommendation for retransmission link(s). Secondly, an originator MLD may request a BA to include status of received MPDUs in link level or MLD level. Thirdly, the originator MLD may request a recipient MLD to send a BA on a different link from the link on which a BAR is received so as to improve reliability of receiving BA. Fourthly, the originator MLD may retransmit missing MPDUs on a link recommended by the recipient MLD in BA, and the originator MLD may continue transmitting new MAC packets on the same recommended link. Fifthly, the recipient MLD may respond to the BAR with a BA including status of received MPDUs on the same link and/or other links via consolidation of receiving status in the scoreboard at MLD level. Additionally, the recipient MLD may respond to the BAR with a BA including one or more recommended link IDs to specify retransmission of missing MPDUs on the recommend link(s) to improve the reliability of retransmission. Moreover, the dynamic link selection for reliable retransmission may be used in protected block ack agreement. Furthermore, a similar mechanism may be used in other control frames for recommending a link and/or providing SINR information.

Illustrative Implementations

Figure 13:
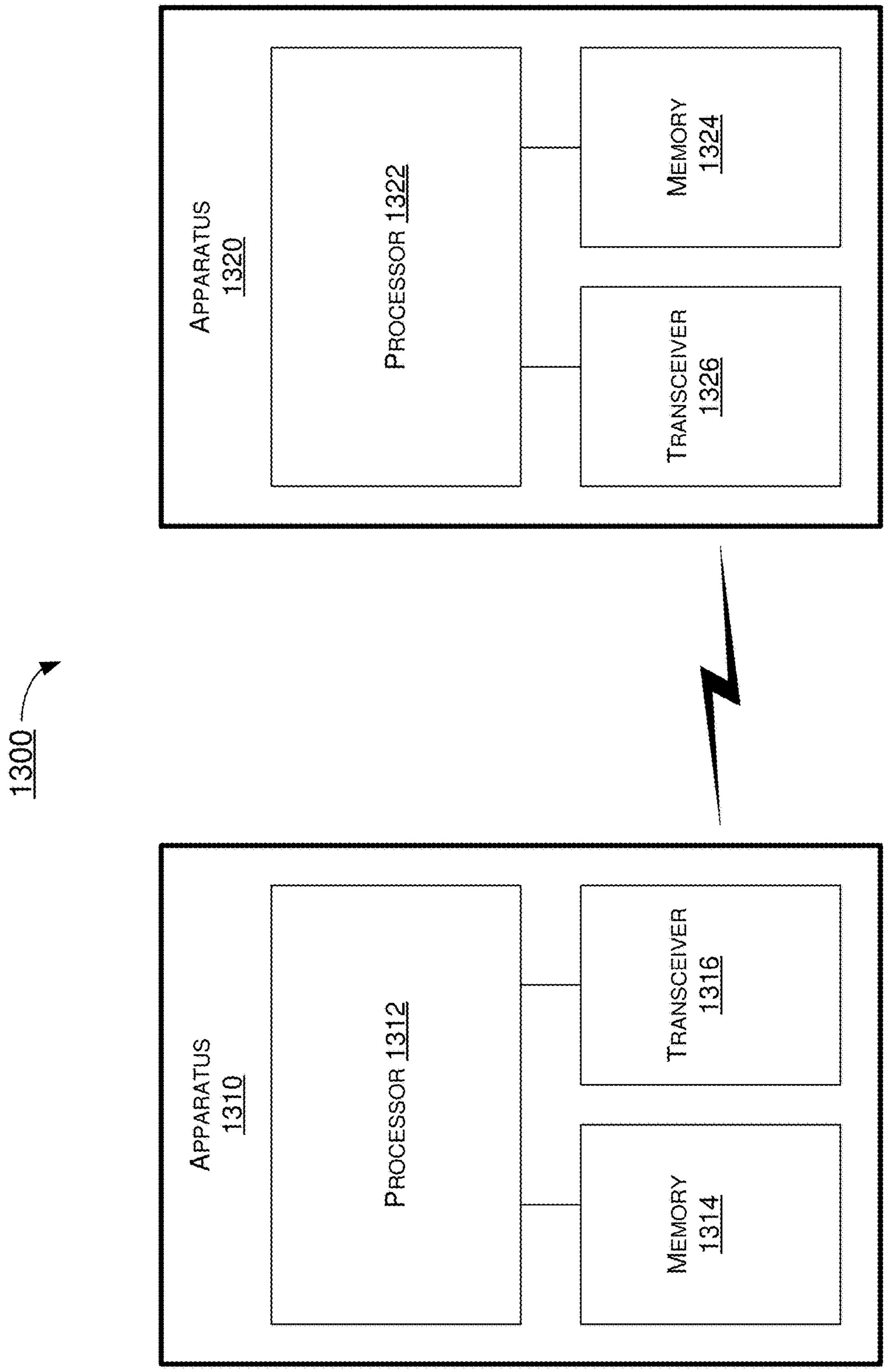
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclosure. One or each of apparatus 1310 and apparatus 1320 may perform various functions to implement schemes, techniques, processes and methods described herein pertaining to dynamic link selection for reliable retransmission in wireless communications, including the various schemes described above with respect to various proposed designs, concepts, schemes, systems and methods described above as well as processes described below. For instance, apparatus 1310 may be implemented in an originator MLD and apparatus 1320 may be implemented in a recipient MLD, or vice versa, under various proposed schemes in accordance with the present disclosure.

Each of apparatus 1310 and apparatus 1320 may be a part of an electronic apparatus, which may be a non-AP MLD or an AP MLD, such as a portable or mobile apparatus, a wearable apparatus, a wireless communication apparatus or a computing apparatus. When implemented in a non-AP MLD, each of apparatus 1310 and apparatus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine type apparatus, which may be an IoT apparatus such as an immobile or a stationary apparatus, a home apparatus, a wired communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP MLD in a WLAN. In any event, in various implementations, one of apparatus 1310 and apparatus 1320 may be implemented in or as a non-AP MLD while the other of apparatus 1310 and apparatus 1320 may be implemented in or as an AP MLD.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1310 and apparatus 1320 may be implemented in or as a non-AP MLD or an AP MLD. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, processor 1312 and processor 1322 may be implemented in the form of one or more single-core processors, one or more multi-core processors, one or more RISC processors or one or more CISC processors. That is, even though a singular term "a processor" is used herein to refer to processor 1312 and processor 1322, processor 1312 and processor 1322 may include multiple processors in some implementations and a single processor in other implementations in accordance with the present disclosure. In another aspect, processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 1312 and processor 1322 is a special-purpose machine specifically designed, arranged and configured to perform specific tasks including those pertaining to dynamic link selection for reliable retransmission in wireless communications in accordance with various implementations of the present disclosure.

In some implementations, apparatus 1310 may also include one or more transceivers 1316 coupled to processor 1312. Each of the one or more transceivers 1316 may include a transmitter capable of wirelessly transmitting and a receiver capable of wirelessly receiving data. In some implementations, apparatus 1320 may also include one or more transceivers 1326 coupled to processor 1322. Each of the one or more transceivers 1326 may include a transmitter capable of wirelessly transmitting and a receiver capable of wirelessly receiving data.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310 (e.g., an originator MLD or a recipient MLD) and apparatus 1320 (e.g., a recipient MLD or an originator MLD), is provided below. It is noteworthy that, although the example implementations described below are provided in the context of WLAN, the same may be implemented in other types of networks. It is also noteworthy that, although examples described below are provide in the context of apparatus 1310, the examples may also be applicable to apparatus 1320 or otherwise implemented by apparatus 1320.

Under various proposed schemes pertaining to dynamic link selection for reliable retransmission in wireless communications in accordance with the present disclosure, processor 1312 may establish, via transceiver 1316, a Block Ack agreement or a protected Block Ack agreement with one other MLD (e.g., apparatus 1320) on one or more enabled links for dynamic link selection. Additionally, processor 1312 may communicate, via transceiver 1316, with the other MLD on at least one of the one or more enabled links prior to termination of the Block Ack agreement or the protected Block Ack agreement.

In some implementations, in communicating, processor 1312 may (as a recipient MLD) perform certain operations. For instance, processor 1312 may select a link from the one or more enabled links. Moreover, processor 1312 may transmit, on the selected link, to the other MLD (as an originator MLD) a Block Ack with a consolidated receiving status in response to receiving a BAR from the other MLD. In some implementations, the selected link may be among one or more ongoing communication links protected by a current TXOP which comprises a period reserved for transmission between the MLD and the other MLD. Alternatively, the selected link may not be among one or more ongoing communication links protected by the current TXOP.

In some implementations, in communicating, processor 1312 may (as a recipient MLD) perform certain operations. For instance, processor 1312 may select a link from the one or more enabled links. Additionally, processor 1312 may transmit, on the selected link, to the other MLD (as an originator MLD) a Block Ack with a consolidated receiving status in response to receiving one or more data packets from the other MLD. In such cases, the selected link may be among one or more ongoing communication links protected by a current TXOP.

In some implementations, in communicating, processor 1312 may (as a recipient MLD) transmit to the other MLD (as an originator MLD) a Block Ack with a consolidated receiving status in response to receiving a BAR with a deferred retransmission indication from the other MLD. In some implementations, the Block Ack may be transmitted on an ongoing communication link protected by a current TXOP. Alternatively, the Block Ack may be transmitted on a link not protected by the current TXOP.

In some implementations, in communicating, processor 1312 may (as a recipient MLD) transmit to the other MLD (as an originator MLD) a Block Ack with a consolidated receiving status in response to receiving a BAR from the other MLD. In some implementations, the Block Ack may be transmitted on a link protected by a current TXOP, and the Block Ack may indicate a recommended link for retransmission of a missing data packet, with the recommend link being an ongoing communication link protected by the current TXOP. Moreover, process 1400 may involve processor 1312 receiving a retransmission of the missing data packet from the other MLD on the recommended link.

In some implementations, in communicating, process 1400 may involve processor 1312 transmitting or receiving a Block Ack that includes SINR information on one or more corresponding links.

In some implementations, in communicating, processor 1312 may (as a recipient MLD) transmit to the other MLD (as an originator MLD) a Block Ack with a consolidated receiving status in response to receiving a BAR from the other MLD. In some implementations, the Block Ack may be transmitted on a link protected by a current TXOP, and the Block Ack may indicate a recommended link for retransmission of a missing data packet, with the recommend link not being an ongoing communication link protected by the current TXOP. Moreover, processor 1312 may receive a retransmission of the missing data packet from the other MLD on the recommended link after the other MLD successfully acquired access to a medium on the recommended link.

In some implementations, in communicating, processor 1312 may (as a recipient MLD) transmit to the other MLD (as an originator MLD) a Block Ack with a consolidated receiving status in response to receiving a BAR from the other MLD. In some implementations, the Block Ack may be transmitted on a link protected by a current TXOP, and the Block Ack may indicate one or more recommended links for duplicating retransmission of a missing data packet, with the one or more recommend links being among ongoing communication links protected by the current TXOP. Additionally, processor 1312 may receive duplicated retransmissions of the missing data packet from the other MLD on the one or more recommended links.

In some implementations, in communicating, processor 1312 may (as a recipient MLD) transmit to the other MLD (as an originator MLD) a Block Ack with a consolidated receiving status in response to receiving a BAR from the other MLD. In some implementations, the Block Ack may be transmitted on a link protected by a current TXOP, and the Block Ack may indicate one or more recommended links for duplicating retransmission of a missing data packet, with the one or more recommend links being not among ongoing communication links protected by the current TXOP. Additionally, processor 1312 may receive duplicated retransmissions of the missing data packet from the other MLD on the one or more recommended links after the other MLD successfully acquired access to media on the one or more recommended links.

In some implementations, in communicating, processor 1312 may (as an originator MLD) transmit a BAR to apparatus 1320 (as a recipient MLD). In some implementations, the BAR may be transmitted on a link protected by a current TXOP, and the BAR may indicate one or more recommended links for retransmission of a missing data packet, with the one or more recommend links being among ongoing communication links protected by the current TXOP. Furthermore, processor 1312 may receive, from the other MLD, a Block Ack with a confirmation of the one or more recommended links for retransmission of one or more missing data packets.

In some implementations, in communicating, processor 1312 may (as an originator MLD) transmit a BAR to apparatus 1320 (as a recipient MLD). In some implementations, the BAR may be transmitted on a link protected by a current TXOP, and the BAR may indicate one or more recommended links for retransmission of a missing data packet, with the one or more recommend links being not among ongoing communication links protected by the current TXOP. Furthermore, processor 1312 may receive, from the other MLD, a Block Ack with a confirmation of the one or more recommended links for retransmission of one or more missing data packets.

Illustrative Processes

Figure 14:
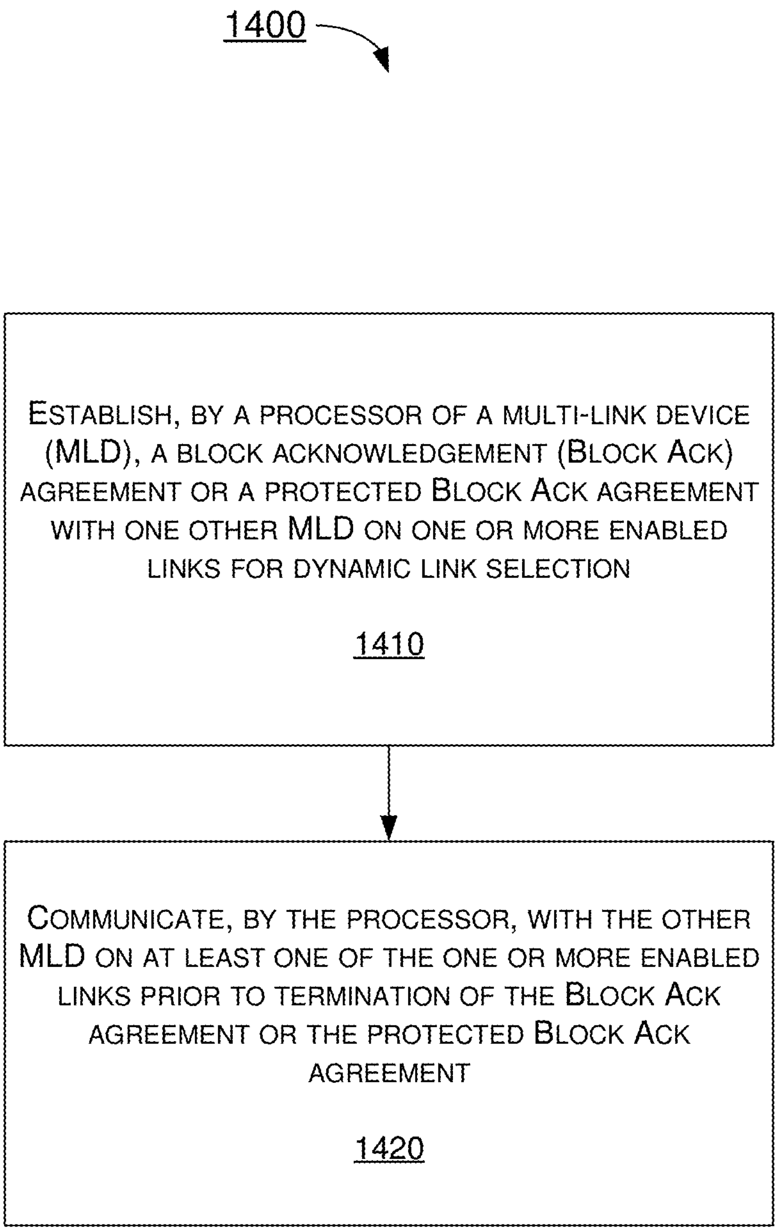
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to dynamic link selection for reliable retransmission in wireless communications in accordance with the present disclosure. Process 1400 may include one or more operations, actions, or functions as illustrated by one or more of blocks 1410 and 1420. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in apparatus 1310 and apparatus 1320 as well as any variations thereof. Solely for illustrative purposes and without limiting the scope, process 1400 is described below in the context of apparatus 1310 implemented in or as MLD 1 and apparatus 1320 implemented in or as MLD 2 of a wireless network such as a WLAN in shown in FIG. 2~FIG. 10 in accordance with one or more of IEEE 802.11 standards. It is noteworthy that, although examples described below are provided in the context of apparatus 1310 implementing a first MLD (e.g., MLD 1) and apparatus 1320 implementing a second MLD (e.g., MLD 2). Process 1400 may begin at block 1410.

At 1410, process 1400 may involve processor 1312 establishing, via transceiver 1316, a Block Ack agreement or a protected Block Ack agreement with one other MLD (e.g., apparatus 1320) on one or more enabled links for dynamic link selection. Process 1400 may proceed from 1410 to 1420.

At 1420, process 1400 may involve processor 1312 communicating, via transceiver 1316, with the other MLD on at least one of the one or more enabled links prior to termination of the Block Ack agreement or the protected Block Ack agreement.

In some implementations, in communicating, process 1400 may involve processor 1312 performing certain operations. For instance, process 1400 may involve processor 1312 selecting a link from the one or more enabled links. Moreover, process 1400 may involve processor 1312 transmitting, on the selected link, to the other MLD a Block Ack with a consolidated receiving status in response to receiving a BAR from the other MLD. In some implementations, the selected link may be among one or more ongoing communication links protected by a current TXOP which comprises a period reserved for transmission between the MLD and the other MLD. Alternatively, the selected link may not be among one or more ongoing communication links protected by the current TXOP.

In some implementations, in communicating, process 1400 may involve processor 1312 performing certain operations. For instance, process 1400 may involve processor 1312 selecting a link from the one or more enabled links. Additionally, process 1400 may involve processor 1312 transmitting, on the selected link, to the other MLD a Block Ack with a consolidated receiving status in response to receiving one or more data packets from the other MLD. In such cases, the selected link may be among one or more ongoing communication links protected by a current TXOP.

In some implementations, in communicating, process 1400 may involve processor 1312 transmitting to the other MLD a Block Ack with a consolidated receiving status in response to receiving a BAR with a deferred retransmission indication from the other MLD. In some implementations, the Block Ack may be transmitted on an ongoing communication link protected by a current TXOP. Alternatively, the Block Ack may be transmitted on a link not protected by the current TXOP.

In some implementations, in communicating, process 1400 may involve processor 1312 transmitting to the other MLD a Block Ack with a consolidated receiving status in response to receiving a BAR from the other MLD. In some implementations, the Block Ack may be transmitted on a link protected by a current TXOP, and the Block Ack may indicate a recommended link for retransmission of a missing data packet, with the recommend link being an ongoing communication link protected by the current TXOP. Moreover, process 1400 may involve processor 1312 receiving a retransmission of the missing data packet from the other MLD on the recommended link.

In some implementations, in communicating, process 1400 may involve processor 1312 transmitting or receiving a Block Ack that includes SINR information on one or more corresponding links.

In some implementations, in communicating, process 1400 may involve processor 1312 transmitting to the other MLD a Block Ack with a consolidated receiving status in response to receiving a BAR from the other MLD. In some implementations, the Block Ack may be transmitted on a link protected by a current TXOP, and the Block Ack may indicate a recommended link for retransmission of a missing data packet, with the recommend link not being an ongoing communication link protected by the current TXOP. Moreover, process 1400 may involve processor 1312 receiving a retransmission of the missing data packet from the other MLD on the recommended link after the other MLD successfully acquired access to a medium on the recommended link.

In some implementations, in communicating, process 1400 may involve processor 1312 transmitting to the other MLD a Block Ack with a consolidated receiving status in response to receiving a BAR from the other MLD. In some implementations, the Block Ack may be transmitted on a link protected by a current TXOP, and the Block Ack may indicate one or more recommended links for duplicating retransmission of a missing data packet, with the one or more recommend links being among ongoing communication links protected by the current TXOP. Additionally, process 1400 may involve processor 1312 receiving duplicated retransmissions of the missing data packet from the other MLD on the one or more recommended links.

In some implementations, in communicating, process 1400 may involve processor 1312 transmitting to the other MLD a Block Ack with a consolidated receiving status in response to receiving a BAR from the other MLD. In some implementations, the Block Ack may be transmitted on a link protected by a current TXOP, and the Block Ack may indicate one or more recommended links for duplicating retransmission of a missing data packet, with the one or more recommend links being not among ongoing communication links protected by the current TXOP. Additionally, process 1400 may involve processor 1312 receiving duplicated retransmissions of the missing data packet from the other MLD on the one or more recommended links after the other MLD successfully acquired access to media on the one or more recommended links.

In some implementations, in communicating, process 1400 may involve processor 1312 (as an originator MLD) transmitting a BAR to apparatus 1320 (as a recipient MLD). In some implementations, the BAR may be transmitted on a link protected by a current TXOP, and the BAR may indicate one or more recommended links for retransmission of a missing data packet, with the one or more recommend links being among ongoing communication links protected by the current TXOP. Furthermore, process 1400 may involve processor 1312 receiving, from the other MLD, a Block Ack with a confirmation of the one or more recommended links for retransmission of one or more missing data packets.

In some implementations, in communicating, process 1400 may involve processor 1312 (as an originator MLD) transmitting a BAR to apparatus 1320 (as a recipient MLD). In some implementations, the BAR may be transmitted on a link protected by a current TXOP, and the BAR may indicate one or more recommended links for retransmission of a missing data packet, with the one or more recommend links being not among ongoing communication links protected by the current TXOP. Furthermore, process 1400 may involve processor 1312 receiving, from the other MLD, a Block Ack with a confirmation of the one or more recommended links for retransmission of one or more missing data packets.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

establishing, by a processor of a multi-link device (MLD), a block acknowledgement (Block Ack) agreement or a protected Block Ack agreement with one other MLD on multiple enabled links mapped by traffic identifier-to-link mapping (T2LM); and communicating, by the processor, with the other MLD on at least one of the multiple enabled links prior to termination of the Block Ack agreement or the protected Block Ack agreement, wherein the communicating comprises:

selecting a link from the multiple enabled links, wherein the selected link is among one or more ongoing communication links protected by a current transmission opportunity (TXOP), which comprises a period reserved for transmission between the MLD and the other MLD; and transmitting, on the selected link, to the other MLD a Block Ack with a consolidated receiving status of a data transmission transmitted from the other MLD in response to receiving a Block Ack request (BAR) or a multi-link BAR (ML-BAR), from the other MLD, wherein the consolidated receiving status means a receiving status consolidated from a link level scoreboard into a MLD level scoreboard; or transmitting, on the selected link, to the other MLD a Block Ack with a consolidated receiving status of a data transmission transmitted from the other MLD in response to receiving one or more data packets from the other MLD, wherein the consolidated receiving status means a receiving status consolidated from a link level scoreboard into a MLD level scoreboard.

2. The method of claim 1, wherein the BAR or the ML-BAR is received with a deferred retransmission indication form the other MLD.

3. The method of claim 1, wherein the Block Ack includes signal-to-interference-and-noise ratio (SINR) information on one or more corresponding links.

4. The method of claim 1, wherein the Block Ack indicates a recommended link for retransmission of a missing data packet, and wherein the recommend link comprises an ongoing communication link protected by the current TXOP.

5. The method of claim 4, wherein the communicating further comprises:

receiving a retransmission of the missing data packet from the other MLD on the recommended link.

6. The method of claim 1, wherein the Block Ack indicates a recommended link for retransmission of a missing data packet, and wherein the recommend link is not an ongoing communication link protected by the current TXOP.

7. The method of claim 6, wherein the communicating further comprises:

receiving a retransmission of the missing data packet from the other MLD on the recommended link after the other MLD successfully acquired access to a medium on the recommended link.

8. The method of claim 1, wherein the Block Ack indicates one or more recommended links for duplicating retransmission of a missing data packet, and wherein the one or more recommend links are among ongoing communication links protected by the current TXOP.

9. The method of claim 8, wherein the communicating further comprises:

receiving duplicated retransmissions of the missing data packet from the other MLD on the one or more recommended links.

10. The method of claim 1, wherein the Block Ack indicates one or more recommended links for duplicating retransmission of a missing data packet, and wherein the one or more recommend links are not among ongoing communication links protected by the current TXOP.

11. The method of claim 7, wherein the communicating further comprises:

receiving duplicated retransmissions of the missing data packet from the other MLD on the one or more recommended links after the other MLD successfully acquired access to media on the one or more recommended links.

12. The method of claim 1, wherein the communicating comprises:

transmitting a second BAR or a second ML-BAR to the other MLD, wherein the second BAR or the second ML-BAR is transmitted on a link protected by the current TXOP, wherein the second BAR or the second ML-BAR indicates one or more recommended links for retransmission of a missing data packet, and wherein the one or more recommend links are among ongoing communication links protected by the current TXOP.

13. The method of claim 12, wherein the communicating further comprises:

receiving, from the other MLD, a Block Ack with a confirmation of the one or more recommended links for retransmission of one or more missing data packets.

14. The method of claim 1, wherein the communicating comprises:

transmitting a second BAR or a second ML-BAR to the other MLD, wherein the BAR or the second ML-BAR is transmitted on a link protected by the current TXOP, wherein the second BAR or the second ML-BAR indicates one or more recommended links for retransmission of a missing data packet, and wherein the one or more recommend links are not among ongoing communication links protected by the current TXOP.

15. The method of claim 14, wherein the communicating further comprises:

receiving, from the other MLD, a Block Ack with a confirmation of the one or more recommended links for retransmission of one or more missing data packets.

16. An apparatus implementable in a multi-link device (MLD), comprising:

a transceiver configured to communicate wirelessly; and a processor coupled to the transceiver and configured to perform, via the transceiver, operations comprising:

establishing, via the transceiver, a block acknowledgement (Block Ack) agreement or a protected Block Ack agreement with one other MLD on multiple enabled links mapped by traffic identifier-to-link mapping (T2LM); and communicating, via the transceiver, with the other MLD on at least one of the multiple enabled links prior to termination of the Block Ack agreement or the protected Block Ack agreement, wherein the communicating comprises:

selecting a link from the multiple enabled links, wherein the selected link is among one or more ongoing communication links protected by a current transmission opportunity (TXOP), which comprises a period reserved for transmission between the MLD and the other MLD; and transmitting, on the selected link, to the other MLD a Block Ack with a consolidated receiving status of a data transmission transmitted from the other MLD in response to receiving a Block Ack request (BAR) or a multi-link BAR (ML-BAR), from the other MLD, wherein the consolidated receiving status means a receiving status consolidated from a link level scoreboard into a MLD level scoreboard; or transmitting, on the selected link, to the other MLD a Block Ack with a consolidated receiving status of a data transmission transmitted from the other MLD in response to receiving one or more data packets from the other MLD, wherein the consolidated receiving status means a receiving status consolidated from a link level scoreboard into a MID level scoreboard.

* * * * *